US009812235B2

(12) United States Patent
Matsuzaki et al.

(10) Patent No.: US 9,812,235 B2
(45) Date of Patent: Nov. 7, 2017

(54) NONLINEAR RESISTIVE COATING MATERIAL, BUS, AND STATOR COIL

(71) Applicant: KABUSHIKI KAISHA TOSHIBA, Tokyo (JP)

(72) Inventors: Hidehito Matsuzaki, Yokohama (JP); Hisashi Kusumori, Itabashi (JP); Motoharu Shiiki, Yokohama (JP); Hideyasu Ando, Kawasaki (JP); Kenichi Nojima, Yokohama (JP); Toshiyuki Nakano, Yokohama (JP); Masafumi Takei, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 145 days.

(21) Appl. No.: 14/802,556

(22) Filed: Jul. 17, 2015

(65) Prior Publication Data
US 2015/0325344 A1 Nov. 12, 2015

Related U.S. Application Data

(63) Continuation of application No. PCT/JP2014/000213, filed on Jan. 17, 2014.

(30) Foreign Application Priority Data

Jan. 18, 2013 (JP) .................. 2013-007253
Dec. 19, 2013 (JP) .................. 2013-262561

(51) Int. Cl.
*C09D 5/24* (2006.01)
*C09D 7/12* (2006.01)
(Continued)

(52) U.S. Cl.
CPC ................ *H01C 7/00* (2013.01); *C09D 5/24* (2013.01); *C09D 7/12* (2013.01); *C09D 163/00* (2013.01);
(Continued)

(58) Field of Classification Search
CPC .......... C09D 5/25; C09D 7/12; C09D 163/00; C09D 175/04; H02K 11/00; H02K 3/30
See application file for complete search history.

(56) References Cited

U.S. PATENT DOCUMENTS 5,087,655 A * 2/1992 Okamoto ................. C08K 7/08
523/172
5,643,994 A * 7/1997 Kish ....................... C04B 26/06
52/698
(Continued)

FOREIGN PATENT DOCUMENTS

CN  101069249 A  11/2007
JP  3028975  4/2000
(Continued)

OTHER PUBLICATIONS

Translation of JP 2012-142377, Jul. 26, 2012.*
(Continued)

*Primary Examiner* — Carol M Koslow
(74) *Attorney, Agent, or Firm* — Oblon, McClelland, Maier & Neustadt, L.L.P.

(57) ABSTRACT

A nonlinear resistive coating material 20 in an embodiment includes: a matrix resin 22 made of an epoxy resin which is cured by adding a curing agent thereto; ZnO-containing particles 21 dispersedly contained in the matrix resin 22 and made of a sintered compact containing ZnO as a main component; and semiconductive surface-treated whiskers 10 dispersedly contained in the matrix resin 22 and made of ZnO subjected to titanate coupling surface modification treatment.

19 Claims, 15 Drawing Sheets

(51) Int. Cl.

| | | |
|---|---|---|
| C09D 133/00 | (2006.01) | |
| C09D 163/00 | (2006.01) | |
| C09D 175/04 | (2006.01) | |
| H01B 1/00 | (2006.01) | |
| H01B 1/20 | (2006.01) | |
| H01C 7/10 | (2006.01) | |
| H01C 7/00 | (2006.01) | |
| H01B 7/02 | (2006.01) | |
| H01B 3/40 | (2006.01) | |
| H02K 3/30 | (2006.01) | |
| H02K 11/00 | (2016.01) | |
| H01C 7/112 | (2006.01) | |

(52) U.S. Cl.
CPC ............. *C09D 175/04* (2013.01); *H01B 3/40* (2013.01); *H01B 7/0233* (2013.01); *H01C 7/112* (2013.01); *H02K 3/30* (2013.01); *H02K 11/00* (2013.01)

(56) References Cited

U.S. PATENT DOCUMENTS

| | | |
|---|---|---|
| 6,124,549 A | 9/2000 | Kemp et al. |
| 2007/0222307 A1 | 9/2007 | Sawa et al. |
| 2010/0292400 A1* | 11/2010 | Morita ............... C08G 59/4215 524/847 |

FOREIGN PATENT DOCUMENTS

| | | | |
|---|---|---|---|
| JP | 2008-254990 | | 10/2008 |
| JP | 2009-249226 | | 10/2009 |
| JP | 2010-195847 | | 9/2010 |
| JP | 2012-142377 | * | 7/2012 |
| RU | 2 168 252 C2 | | 5/2001 |
| WO | WO 2009/041333 A1 | | 4/2009 |

OTHER PUBLICATIONS

Combined Chinese Office Action and Search Report dated Apr. 7, 2016 in Patent Application No. 201480005152.9 (with English language translation and English translation of categories of cited documents).

Lü Zhaosheng, et al., "Effect of Coupling Agents on Mechanical Properties of PPS/PA66/T-ZNOW Composites" China Academic Journal Electronic Publishing House, 2008, pp. 10-13 (with English Abstract).

English translation of International Preliminary Report on Patentability and Written Opinion dated Jul. 30, 2015 in PCT/JP2014/000213.

International Search Report dated Apr. 15, 2015 in PCT/JP2014/000213 filed Jan. 17, 2014.

Combined Office Action and Search Report dated Nov. 4, 2016 in Chinese Patent Application No. 201480005152.9 (with English language translation and English translation of Categories of Cited Documents).

Combined Office Action and Search Report dated Oct. 18, 2016 in Russian Patent Application No. 2015134535 (with English language translation).

* cited by examiner

NONLINEAR RESISTIVE COATING MATERIAL, BUS, AND STATOR COIL

CROSS-REFERENCE TO RELATED APPLICATIONS

This application is a continuation of prior International Application No. PCT/JP2014/000213 filed on Jan. 17, 2014, which is based upon and claims the benefit of priority from Japanese Patent Applications No. 2013-007253 filed on Jan. 18, 2013 and No. 2013-262561 filed on Dec. 19, 2013; the entire contents of all of which are incorporated herein by reference.

FIELD

Embodiment described herein relate generally to a nonlinear resistive coating material, a bus, and a stator coil.

BACKGROUND

A problem of a closed insulating device such as a gas-sealed switchgear in which a high-voltage conductor supported by an insulator is provided in a container in which an insulating gas is sealed therein, is miniaturization by rationalization of insulation design or three-phase integration for cost reduction and environmental load reduction.

The size of the metal container of the closed insulating device is decided by insulation design, thermal design or the like. One of points of the insulation design is to discuss the influence on the insulation performance in the case where a foreign substance exists (adheres) on the inner surface of the metal container.

When a foreign substance exists in the metal container in which the high-voltage conductor supported by the insulator is housed and the insulating gas is sealed, force is generated to the foreign substance due to interaction between charges supplied from the metal container or the like and an operation voltage. Therefore, the foreign substance sometimes moves around in the metal container.

When the closed insulating device is miniaturized, the electric field on the inner surface of the metal container increases and the movement of the foreign substance existing in the metal container is thus likely to become active. The foreign substance, if excessively moving in the metal container, sometimes affects the insulation performance. Further, with a longer shape of the foreign substance, the foreign substance more greatly moves and thus more greatly affects the insulation performance.

For this reason, to prevent the long foreign substance from entering the inside of the metal container, for example, a foreign substance management process is provided to remove the foreign substance in a manufacturing process to thereby enhance the management of the foreign substance. Further, it is necessary to design the electric field intensity on the inner surface of the metal container at the application of the operation voltage to prevent a small foreign substance that is difficult to manage from floating to a height taken into consideration in design or higher and moving around. Here, the height means the distance between the inner surface of the metal container and the foreign substance.

The electric field intensity on the inner surface of the metal container depends on the distance between the high-voltage conductor and the inner surface of the metal container. Therefore, to suppress the floating height of the foreign substance, it is necessary to increase the size of the metal container. This becomes a factor in hindering the miniaturization of the closed insulating device.

There is, as a method of mitigating the influence by the foreign substance, a method of suppressing the movement of the foreign substance. As this method, a method of coating the inner surface of the metal container of the closed insulating device with a highly insulative resin can be exemplified. Coating of the inner surface of the metal container with the resin suppresses the supply of charges from the inner surface of the metal container to the foreign substance to make the foreign substance difficult to move. Further, as the material subjected to the coating of the inner surface of the metal container, an insulating coating material in which particles of a nonlinear resistive material are dispersed in a resin is also under discussion.

The insulating coating material is used not only for the above-described closed insulating device but also for a power generator. A coil conductor of the power generator is at a high voltage, and an iron core of the power generator is at an earth potential. At an iron core outlet of the coil conductor, the potential on the surface of the coil conductor rapidly increases from the earth potential to the high voltage. Therefore, discharge is caused in an edgewise direction of the coil conductor at the iron core outlet. To suppress the discharge, an insulating coating material is used.

In the conventional insulating coating material used for the above-described closed insulating device and power generator, in the case of dispersing the particles of the nonlinear resistive material in the resin, for example, addition of whiskers each having a tetrapod shape is under discussion to ensure a conductive path. Further, the whiskers have been subjected to silane-coupling treatment in order to enhance the wettability with the epoxy resin.

However, in the case of using the conventional insulating coating material as a coating material, the whiskers being an additive and subjected to silane-coupling treatment sometimes aggregate due to addition of a diluting solvent. Therefore, the whiskers exist aggregating on the coating film surface or in the coating film to cause irregularities on the coating film surface. Thus, the insulating coating material cannot sometimes exhibit the nonlinear resistance characteristic which should originally be exhibited.

DETAILED DESCRIPTION

Figure 1:
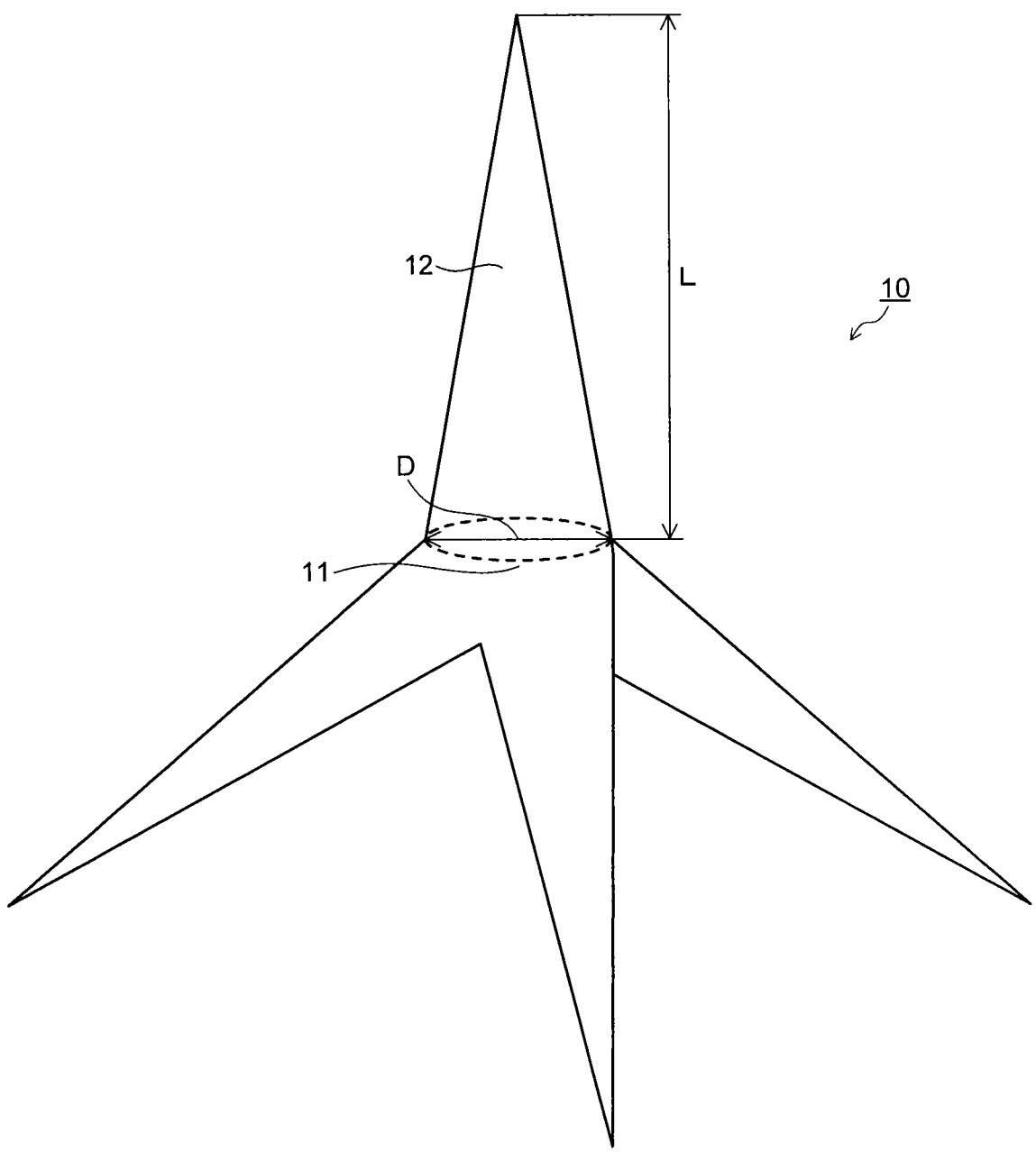
FIG. 1 is a perspective view schematically illustrating a semiconductive whisker made of ZnO subjected to titanate coupling surface modification treatment contained in a nonlinear resistive coating material in an embodiment.

A nonlinear resistive coating material in an embodiment includes: a matrix resin made of an epoxy resin which is cured by adding a curing agent thereto; particles dispersedly contained in the matrix resin and made of a sintered compact containing ZnO as a main component; and semiconductive whiskers dispersedly contained in the matrix resin and made of ZnO subjected to titanate coupling surface modification treatment.

Hereinafter, an embodiment of the present invention will be described referring to the drawings.

A nonlinear resistive coating material in an embodiment contains particles made of a sintered compact containing zinc oxide (ZnO) as a main component and semiconductive whiskers made of zinc oxide (ZnO) subjected to titanate coupling surface modification treatment, which are dispersed in a matrix resin. The matrix resin is made of an epoxy resin cured by adding a curing agent thereto, or an acrylic resin, an epoxy resin or a polyurethane resin which are cured by heating.

First, the acrylic resin, the epoxy resin or the polyurethane resin constituting the matrix resin will be described. These resins are liquid before curing.

The epoxy resin constitutes an epoxy-based coating material, and is made of an epoxy compound having two or more epoxy groups per molecule. As the epoxy compound, any compound can be arbitrarily used as long as it has, in one molecule, two or more three-membered rings each composed of two carbon atoms and one oxygen atom and is curable, and its kind is not particularly limited.

The epoxy resin is classified into the one that is cured by heating without adding a curing agent thereto (hereinafter, a one-part epoxy resin), and the one that is cured by adding a curing agent thereto (hereinafter, a two-part epoxy resin).

The one-part epoxy resin is liquid, for example, near room temperature (for example, 25° C.). As the epoxy resin, for example, publicly-known various kinds of epoxy resin which are used as the one-part epoxy resin can be used.

Examples of the one-part epoxy resin include compounds in which two or more epoxy groups are bound to the terminal of an aromatic ring or a hydrogenated aromatic ring such as a benzene ring, a naphthalene ring, a hydrogenated benzene ring. Concrete examples of the one-part epoxy resin include bisphenol A diglycidyl ether, bisphenol F diglycidyl ether, bisphenol A ethylene oxide two-molar adduct diglycidyl ether, bisphenol A-1,2-propylene oxide two-molar adduct diglycidyl ether, hydrogenated bisphenol A diglycidyl ether, hydrogenated bisphenol F diglycidyl ether, orthophthalic acid diglycidyl ester, tetrahydroisophthalic acid diglycidyl ester, N,N-diglycidylaniline, N,N-diglycidyltoluidine, N,N-diglycidylaniline-3-glycidyl ether, tetraglycidylmethaxylene diamine, 1,3-bis(N,N-diglycidyl aminomethylene)cyclohexane, and tetrabromobisphenol A diglycidyl ether. These can be used not only singly but also in combination of two or more kinds. For example, in terms of having excellent heat resistance after curing, among the resins, it is preferable to use bisphenol A diglycidyl ether, hydrogenated bisphenol A diglycidyl ether, bisphenol F diglycidyl ether, or hydrogenated bisphenol F diglycidyl ether.

The above-described one-part epoxy resin is cured by heating, for example, at a temperature of 80° C. to 120° C. for about 30 minutes to about 2 hours.

Examples of the two-part epoxy resin include: glycidyl ether type epoxy resins such as bisphenol A type epoxy resin, brominated bisphenol A type epoxy resin, hydrogenated bisphenol A type epoxy resin, bisphenol F type epoxy resin, bisphenol S type epoxy resin, bisphenol AF type epoxy resin, biphenyl type epoxy resin, naphthalene type epoxy resin, fluorene type epoxy resin, novolac type epoxy resin, phenol-novolac type epoxy resin, orthocresol-novolac type epoxy resin, tris(hydroxyphenyl) methane type epoxy resin, and tetraphenylolethane type epoxy resin; and heterocyclic epoxy resins such as glycidyl ester type epoxy resin obtained by condensation of epichlorohydrin and carboxylic acid, hydantoin type epoxy resin obtained by reaction of triglycidyl isocyanate or epichlorohydrin and hydantoins, and so on. These can be used not only singly but also in combination of two or more kinds.

A curing agent that cures the two-part epoxy resin chemically reacts with the epoxy resin to thereby cure the epoxy resin. Any curing agent can be arbitrarily used as long as it cures the epoxy resin and its kind is not particularly limited. As the curing agent, for example, an amine-based curing agent, an acid anhydride-based curing agent or the like can be used. As the amine-based curing agent, for example, ethylenediamine, polyamidoamine, triethylenetetramine or the like can be used. As the acid anhydride-based curing agent, for example, phthalic anhydride, hexahydrophthalic anhydride, 4-methylhexahydrophthalic anhydride, tetrahydrophthalic anhydride, 4-methyltetrahydrophthalic anhydride, tetrabromophthalic anhydride or the like can be used. The additive amount of the curing agent is preferably 10 parts by mass to 15 parts by mass to 100 parts by mass of the matrix resin (two-part epoxy resin).

The acrylic resin is widely used because there are a wide variety of kinds of acrylic monomer as its raw material and its physical properties and chemical properties such as adherence, adhesiveness, hardness, transparency, light resistance, weather resistance, chemical resistance and so on can be freely controlled. Further, a composition using the acrylic resin is unlikely to receive curing inhibition by air during curing reaction, and is thus preferable, for example, for the case of producing a coating material with high strength.

As the acrylic resin, for example, a polyfunctional acrylic monomer (A) having two or more methacryloyl groups ($CH_2$=C($CH_3$)—C(O)O—) in a molecule can be exemplified. Examples of the polyfunctional acrylic monomer (A) having two or more methacryloyl groups in a molecule include ethylene glycol dimethacrylate, diethylene glycol dimethacrylate, polyethylene glycol dimethacrylate, propylene glycol dimethacrylate, dipropylene glycol dimethacrylate, tripropylene glycol dimethacrylate, polypropylene glycol dimethacrylate, 1,3-butanedioldimethacrylate, 1,4-butanedioldimethacrylate, trimethylolpropane trimethacrylate, pentaerythritol dimethacrylate, pentaerythritol trimethacrylate, pentaerythritol tetramethacrylate, neopentyl glycol dimethacrylate, methacrylic acid adduct of bisphenol A diglycidyl ether, ethylene oxide modified bisphenol A dimethacrylate and so on. These can be used not only singly but also in combination of two or more kinds.

In the coating material using the acrylic resin, generally a diluting solvent volatilizes by high-temperature heating and the acrylic monomer in the resin is cured by polycondensation. For example, in a coating material containing the above-described polyfunctional acrylic monomer having methacryloyl groups as the matrix resin, the diluting solvent volatilizes by high-temperature heating and the polyfunctional acrylic monomer is cured by polycondensation. The above-described acrylic resin is cured by heating, for example, at a temperature of 80° C. to 120° C. for about 30 minutes to about 2 hours.

The polyurethane resin is a resin produced by addition polymerization of polyisocyanate and polyol or monool. The polyurethane resin is widely used as a thermoplastic material or a thermosetting material.

Examples of polyisocyanate include aromatic polyisocyanate (tolylene diisocyanate, 4,4'-diphenylmethane diisocyanate, xylylenediisocyanate, tolidine diisocyanate, dioctyladipate and so on), alicyclic polyisocyanate (dicyclohexylmethane diisocyanate, isophorone diisocyanate, isopropylidenebis(4-cyclohexylisocyanate), hydrogenated xylylenediisocyanate, cyclohexyl diisocyanate, isophorone diisocyanate and so on), aliphatic polyisocyanate (hexamethylene diisocyanate, lysine diisocyanate, 2,2,4- and 2,4,4-trimethyl hexamethylene diisocyanate and so on). Among them, in terms of yellowing of the polyurethane resin to be obtained, aliphatic polyisocyanate and alicyclic polyisocyanate are preferable. These can be used not only singly but also in combination of two or more kinds.

Examples of polyol include: polyether polyols made by performing addition polymerization of propylene oxide or propylene oxide and alkylene oxide such as ethylene oxide to polyhydric alcohol such as ethylene glycol, propylene glycol, glycerin, trimethylolpropane, pentaerythritol, sorbitol, and sucrose; ethylene glycol, propylene glycol, and their oligo glycols; butylene glycol, hexylene glycol, and polytetramethylene ether glycols: polycaprolactonepolyols; polyesterpolyols such as polyethyleneadipate; polybutadienepolyols; higher fatty acid esters having a hydroxyl group such as castor oil; polymer polyols made by grafting vinyl monomer on polyether polyols or polyester polyols; and so on. These can be used not only singly but also in combination of two or more kinds.

Examples of monool include polyoxyalkylene monool, polyester monool, polyether/ester monool, higher saturated monool, monool having an ethylenic unsaturated double bond and so on. These can be used not only singly but also in combination of two or more kinds.

In the coating material using the polyurethane resin, a substance made by compounding polyisocyanate and polyol or monool in advance is used as the matrix resin and cured due to volatilization of the diluting solvent by high-temperature heating. The above-described polyurethane resin is cured by heating, for example, at a temperature of 80° C. to 120° C. for about 30 minutes to about 2 hours.

Here, the acrylic resin, the epoxy resin, and the polyurethane resin which are cured by heating can be used not only singly but also in combination of two or more kinds. For example, the acrylic resin and the epoxy resin may be combined, or the acrylic resin, the epoxy resin, and the polyurethane resin may be combined.

Next, the particles made of the sintered compact containing ZnO as a main component will be described.

The particles made of the sintered compact containing ZnO as a main component (hereinafter, referred to as ZnO-containing particles) have nonlinear resistance. The sintered compact has been sintered containing at least one kind of metal oxides such as $Bi_2O_3$, $Co_2O_3$, MnO, $Sb_2O_3$, and NiO as a sub-component, and is formed in a spherical shape or a substantially spherical shape. Further, the sintered compact is made by bringing a structural object having a structure in which the conductive ZnO particles surrounded by an insulating grain boundary layer are made into an aggregate by sintering. A nonlinear resistance characteristic is created at the grain boundary of the conductive ZnO particle surrounded by the insulating grain boundary layer, so that an individual particle itself of the particles made of the sintered compact exhibits the nonlinear resistance characteristic.

An average particle size of the ZnO-containing particles is preferably 10 μm to 100 μm in order to ensure the workability of painting or the like while making a single ZnO-containing particle exhibit the nonlinear resistance characteristic. The ZnO-containing particles having an average particle size of 30 μm to 80 μm in this range, with which the nonlinear resistance characteristic is better, are more preferable.

Here, the average particle size is obtained by observing the cross section of a predetermined resin containing ZnO-containing particles dispersed therein under a SEM (scanning electron microscope) and measuring the particle sizes of the individual ZnO-containing particles and arithmetically averaging them.

The content of the ZnO-containing particles is preferably 40 parts by mass to 90 parts by mass to 100 parts by mass of the matrix resin in order to ensure the workability of painting and forming of a conductive path in the nonlinear resistive coating material. Further, the content of the ZnO-containing particles is more preferably 50 parts by mass to 70 parts by mass to 100 parts by mass of the matrix resin.

Next, the semiconductive whiskers made of ZnO subjected to titanate coupling surface modification treatment will be described. FIG. 1 is a perspective view schematically illustrating a semiconductive whisker made of ZnO subjected to titanate coupling surface modification treatment contained in the nonlinear resistive coating material in the embodiment.

The semiconductive whisker made of ZnO subjected to titanate coupling surface modification treatment (hereinafter, referred to as a surface-treated whisker 10) has a tetrapod shape composed of a nucleus part 11 and needle crystal parts 12 extending from the nucleus part 11 in four axial directions. The surface-treated whisker 10 is made by subjecting a titanate coupling surface modification treatment to the surface of the whisker made of stable ZnO that is semiconductive and has a specific resistance of 1 Ω·cm to 5000 Ω·cm.

In the matrix resin, in order that the surface-treated whisker 10 couples the ZnO-containing particles to form an excellent conductive path, a length L of the needle crystal part 12 of the surface-treated whisker 10 is preferably 2 µm to 50 µm and a mean diameter D (arithmetic mean diameter) of a portion having the maximum diameter of the needle crystal part 12 is preferably 0.2 µm to 3.0 µm. As the semiconductive whisker made of ZnO, for example, Pana-Tetra (made by AMTEC Co., Ltd.) can be used.

In the matrix resin, in order that the surface-treated whisker 10 couples the ZnO-containing particles to form an excellent conductive path so as to ensure the workability of painting or the like, it is preferable that 5 parts by mass to 30 parts by mass of the surface-treated whiskers 10 are contained in 100 parts by mass of the matrix resin.

Examples of a titanate coupling agent used for the titanate coupling surface modification treatment include isopropyl triisostearoyltite, isopropyl tridodecylbenzenesulfonyl titanate, isopropyl-tris(dioctylpyrophosphate) titanate, tetraisopropyl-bis(dioctylphosphite) titanate, tetraoctyl-bis(ditridecylphosphite) titanate, tetra(2,2-diallyloxymethyl-1-butyl)-bis(ditridecyl)phosphite titanate, bis(dioctylpyrophosphate) oxyacetate titanate and so on. The compounding amount of the titanate coupling agent is preferably 0.1 parts by mass to 1 part by mass to 100 parts by mass of the whiskers made of ZnO not subjected to titanate coupling surface modification treatment.

By performing the titanate coupling surface modification treatment as described above, the wettability with the matrix resin can be improved.

As the titanate coupling surface modification treatment, for example, a method of mechanically mixing the whiskers (surface-untreated product) made of ZnO together with the titanate coupling agent using a container capable of mixing powder, a method (integral blending method) of adding the titanate coupling agent when compounding the whiskers (surface-untreated product) made of ZnO in a resin or the like can be used.

Here, in order to improve the workability in the case of coating a structural object with the nonlinear resistive coating material using a brush or in the case of performing painting using an airless spray, a diluting solvent may be added to the nonlinear resistive coating material. As the diluting solvent, a quick-drying thinner (for example, a mixture made by mixing ethyl acetate and toluene at a mass ratio of 8:2) or the like can be used. The diluting solvent is preferably added by 1 part by mass to 10 parts by mass to 100 parts by mass of the matrix resin in order to improve the above-described workability.

In order to prevent generation of foam in the matrix resin or extinguish generated foam, a defoaming agent may be added into the matrix resin. The defoaming agent is not particularly limited, but a dimethyl silicone-based defoaming agent (for example, TSA720 (manufactured by GE Toshiba Silicone Co., Ltd.) or the like) can be used.

It is preferable to add 0.1 parts by mass to 5 parts by mass of the defoaming agent to 100 parts by mass of the matrix resin, in consideration of the minimum additive amount with which the defoaming agent dispersed in the matrix resin exhibits a defoaming effect and the maximum additive amount with which the defoaming agent does not affect the electric characteristics of the nonlinear resistive coating material.

Further, to enhance the water resistance of the coating film, an antirust agent may be added to the nonlinear resistive coating material. Examples of the antirust agent include: lead-based antirust pigments made of powders of zinc, red lead, lead suboxide, lead cyanamide, zinc phosphate, aluminum phosphate, zinc molybdate, calcium metaplumbate, zinc chromate, MIO (a hexagonal crystal structure made by coating iron oxide with titanium oxide) and the like; chromate-based antirust pigments made of powders of zinc chromate, strontium chromate and the like; powders of phosphoric acid compound of ZnO, phosphoric acid compound of calcium oxide and so on. Among them, it is preferable to use a phosphoric acid compound of ZnO excellent in antirust effect.

It is preferable to add 1 part by mass to 10 parts by mass of the antirust agent to 100 parts by mass of the matrix resin, in consideration of the minimum additive amount with which the antirust agent dispersed in the matrix resin exhibits the antirust effect and the maximum additive amount with which the antirust agent does not affect the electric characteristics of the nonlinear resistive coating material.

Further, to color the coating film, a pigment may be added to the nonlinear resistive coating material. Examples of the pigment include titanium white, zinc white, carbon black, permanent red, chrome yellow, cyanine blue, iron blue, ultramarine blue, cyanine green, iron red ($Fe_2O_3$), EPOMARINE orange and so on.

It is preferable to add 1 part by mass to 15 parts by mass of the pigment to 100 parts by mass of the matrix resin, in consideration of the minimum additive amount with which the pigment dispersed in the matrix resin exhibits a coloring effect and the maximum additive amount with which the pigment does not affect the electric characteristics of the nonlinear resistive coating material.

Further, in order to further improve the dispersibility of the filler, a dispersing agent may be added to the nonlinear resistive coating material. As the dispersing agent, a surface active agent such as high molecular surface active agent, polycarboxylic acid type high molecular surface active agent, alkylimidazoline-based surface active agent, nonionic surface active agent can be used. For example, Homogenol L-100 (manufactured by Kao Corporation) and so on can be exemplified as the high molecular surface active agent, for example, Homogenol L-18 and Homogenol L-1820 (manufactured by Kao Corporation) and so on can be exemplified as the polycarboxylic acid type high molecular surface active agent, for example, Homogenol L-95 (manufactured by Kao Corporation) and so on can be exemplified as the imidazoline-based surface active agent, for example, Pitzcol K-30, Pitzcol K-30L, Pitzcol K-90, Pitzcol K-90L, Discol N-509, Discol N-518, Discol 202, Discol 206 (Dai-ichi Kogyo Seiyaku Co., Ltd.) and so on can be exemplified as the nonionic surface active agent. Among them, it is preferable to use Homogenol L-18, L-1820 which is excellent in dispersion effect.

It is preferable to add 0.5 parts by mass to 5 parts by mass of the dispersing agent to 100 parts by mass of the matrix resin, in order to obtain sufficient dispersion effect.

Further, to suppress settling of the ZnO-containing particles, an antisettling agent may be added to the nonlinear resistive coating material. It is preferable to use, as the antisettling agent, for example, a finely powdered material containing alumina (aluminum oxide), silica (silicon dioxide), or titania (titanium dioxide) as a main component and having an average particle size of 5 nm to 40 nm. Concretely, alumina Aerosil (for example, AEROXIDE Alu C (NIPPON AEROSIL CO., LTD) or the like), silica Aerosil (for example, AERSIL 200 (NIPPON AEROSIL CO., LTD) or the like), titania Aerosil (for example, AEROXIDE $TiO_2$ P 25 (NIPPON AEROSIL CO., LTD) or the like) and so on can be exemplified. Here, the reason why it is preferable to set the average particle size to 5 nm to 40 nm is that the lower limit of the particle size of Aerosil with which nanoparticles aggregate is 5 nm and the upper limit of the particle size of Aerosil which gets into the above-described filler to exhibit the antisettling effect is 40 nm. Among them, it is preferable to use silica Aerosil or alumina Aerosil which is excellent in antisettling effect.

Further, as the antisettling agent, for example, talc (for example, D-1000) (manufactured by Nippon Talc Co., Ltd.) or the like) may be used.

Here, the above-described Aerosil is made into masterbatch and dispersed for use. Aerosil swells by the coating material, and gets in between the ZnO-containing particles and thereby plays a role of preventing settling of the ZnO-containing particles and uniformly dispersing the ZnO-containing particles. On the other hand, talc has a structure in a flat plate shape, gets in between the ZnO-containing particles and thereby plays a role of preventing settling of the ZnO-containing particles and uniformly dispersing the ZnO-containing particles, and improves waterproof performance of the coating film by its flat plate-shaped structure.

It is preferable to add 0.5 parts by mass to 5 parts by mass of the antisettling agent to 100 parts by mass of the matrix resin, in order to obtain sufficient antisettling effect.

Further, addition of both of the above-described dispersing agent and the antisettling agent can further improve the dispersibility of the ZnO-containing particles. Addition of the dispersing agent and the antisettling agent makes it possible to form an absorbing layer on the surface of the ZnO-containing particle. In other words, increasing the surface charge of the ZnO-containing particle being a solid body or enhancing the repulsive force between the ZnO-containing particles by steric hindrance makes it possible to stably disperse the ZnO-containing particles in the matrix resin.

Figure 2:
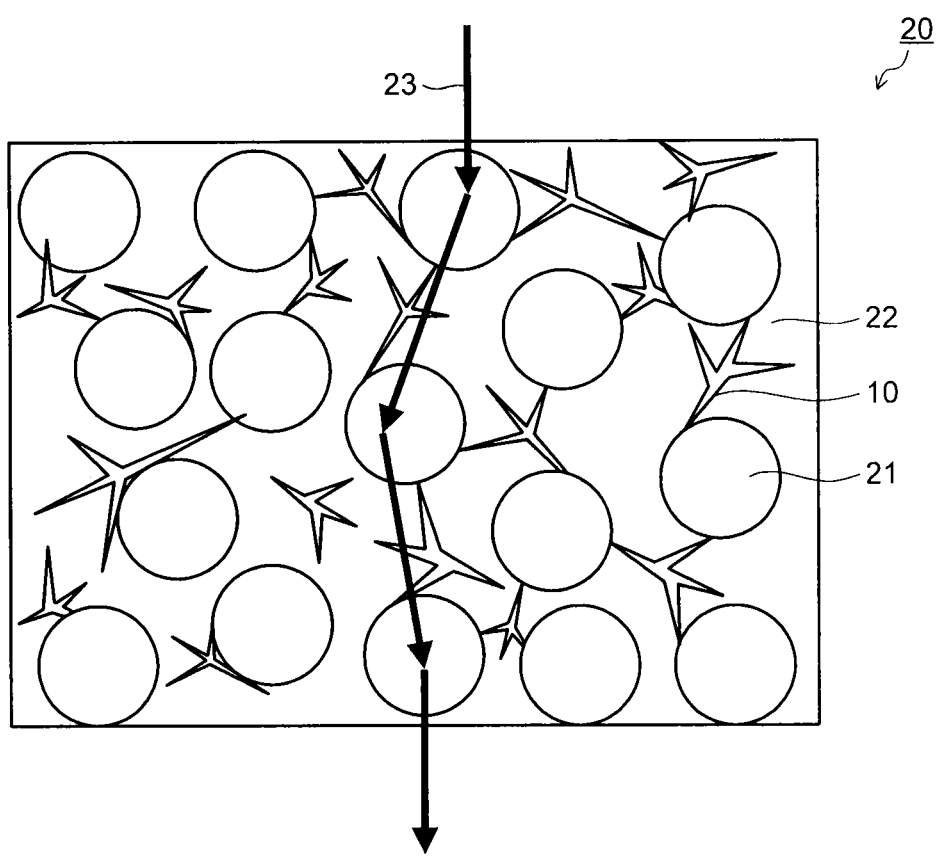
FIG. 2 is a view schematically illustrating a configuration of the nonlinear resistive coating material in the embodiment to describe a conductive path formed by ZnO-containing particles and the surface-treated whiskers.

Here, FIG. 2 is a view schematically illustrating a configuration of a nonlinear resistive coating material 20 in the embodiment to describe a conductive path 23 formed by ZnO-containing particles 21 and the surface-treated whiskers 10.

As illustrated in FIG. 2, the surface-treated whiskers 10 get in between the ZnO-containing particles 21 to disperse the ZnO-containing particles 21 in a matrix resin 22. This makes it possible to improve the nonlinear resistance characteristic exhibited by the ZnO-containing particles 21. Further, the surface-treated whiskers 10 come into contact with the ZnO-containing particles 21 to electrically connect the ZnO-containing particles 21 to thereby form the three-dimensional conductive path 23.

Here, to electrically connect the ZnO-containing particles 21 to thereby form the conductive path, for example, addition of particles made of a low-resistance material such as carbon in place of the surface-treated whiskers 10 is conceivable but is unsuitable because it leads to dielectric breakdown. On the contrary, using the above-described semiconductive surface-treated whiskers 10 makes it possible to prevent the dielectric breakdown.

Note that also in the case where the dispersing agent and the antisettling agent are added, the conductive path 23 is formed by the ZnO-containing particles 21 and the surface-treated whiskers 10 as described above.

Next, a method of manufacturing the nonlinear resistive coating material 20 in the embodiment will be described.

First, a case of using the epoxy resin as the matrix resin 22 will be described as an example. Here, the case of using the two-part epoxy resin as the epoxy resin will be mainly described.

First, part of the epoxy resin to be compounded (for example, about 10 mass % to about 50 mass % of the total compounding amount of the epoxy resin) and a predetermined amount of the surface-treated whiskers 10 are stirred by a rotation and revolution mixer to produce a masterbatch. Here, in the case of adding the defoaming agent, the dispersing agent, and the antisettling agent, they are added when the masterbatch is produced.

Subsequently, the remainder of the epoxy resin and a predetermined amount of ZnO-containing particles 21 are added to the masterbatch, and they are stirred by the rotation and revolution mixer or the like. Here, in the case of adding the antirust agent and the pigment, they are added together with the remainder of the epoxy resin and the ZnO-containing particles 21.

Subsequently, a predetermined amount of the curing agent that cures the epoxy resin is added to the mixture to which the remainder of the epoxy resin and the ZnO-containing particles 21 have been added, and they are stirred by the rotation and revolution mixer or the like. Here, in the case of adding the diluting solvent, it is added together with the curing agent.

Through the processes, the nonlinear resistive coating material 20 is manufactured.

As described above, the masterbatch containing the surface-treated whiskers 10 is produced first, and then the remaining constituent is mixed into the masterbatch, whereby the surface-treated whiskers 10 can be uniformly dispersed in the nonlinear resistive coating material 20. Uniformly dispersing the surface-treated whiskers 10 makes it possible to suppress settling of the ZnO-containing particles 21 to thereby form an excellent conductive path 23.

The nonlinear resistive coating material 20 produced as described above is cast into, for example, a mold and shaped, and left as it is for a predetermined time to be cured, whereby a cast cured product can be manufactured. Further, the nonlinear resistive coating material 20 is applied to the structural object using a brush or the like and left as it is for a predetermined time to be cured, whereby a nonlinear resistive film can be formed.

Further, in the case where the diluting solvent is added to the nonlinear resistive coating material 20, its viscosity decreases. Therefore, for example, the nonlinear resistive coating material 20 is sprayed to the structural object using an airless spray or the like and left as it is for a predetermined time to be cured, whereby the nonlinear resistive film can be formed.

Note that at the time when forming the nonlinear resistive film, a larger thickness of the nonlinear resistive film is better in terms of a viewpoint of exhibition of the nonlinear resistance characteristic, and thick coating of about 500 μm is possible in terms of the painting workability.

Here, the case of using the one-part epoxy resin is used as the epoxy resin, the process of adding the curing agent becomes unnecessary in the above-described manufacturing process. On the other hand, it is necessary to perform heating at a temperature of 80° C. to 120° C. for about 30 minutes to about 2 hours at the time when curing the one-part epoxy resin. Other processes in the case of using the one-part epoxy resin are the same as those in the case of using the two-part epoxy resin.

In the case of using the acrylic resin or the polyurethane resin as the matrix resin 22, the acrylic resin or the polyurethane resin is cured by being heated without adding the curing agent thereto. Therefore, the nonlinear resistive coating material 20 is manufactured through the same process as that of the case of using the one-part epoxy resin as the epoxy resin.

Figure 3:
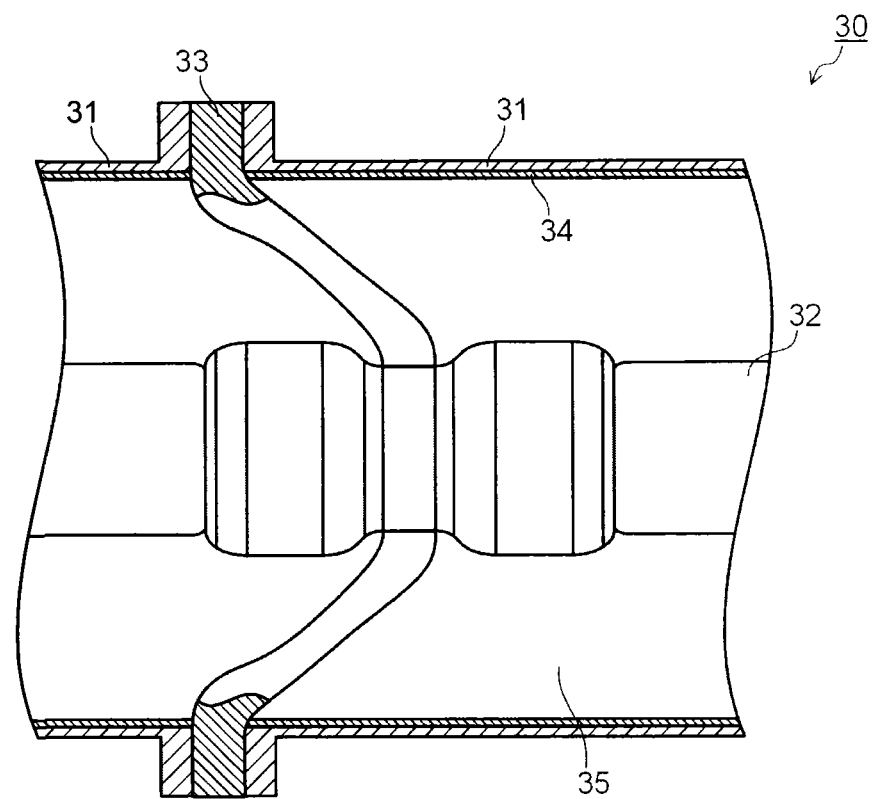
FIG. 3 is a view illustrating electric equipment formed with a nonlinear resistive film using the nonlinear resistive coating material in the embodiment with a part thereof illustrated in a cross section.

FIG. 3 is a view illustrating electric equipment formed with a nonlinear resistive film 34 using the nonlinear resistive coating material 20 in the embodiment with a part thereof illustrated in a cross section. Note that FIG. 3 illustrates a closed insulating device 30 as an example of the electric equipment. As the closed insulating device 30, for example, a bus of a gas-insulated switchgear (GIS) or the like is exemplified. Here, a bus serving as the closed insulating device 30 will be described as an example.

As illustrated in FIG. 3, the closed insulating device 30 includes a cylindrical metal container 31 which can be divided into a plurality parts in an axial direction, a high-voltage conductor 32 which is disposed at the center and in the axial direction, and a spacer 33 provided between the metal containers 31.

The spacer 33 is disposed to divide the inside of the metal container 31 in a direction perpendicular to the center axis of the cylinder. Further, the nonlinear resistive film 34 formed using the nonlinear resistive coating material 20 in the embodiment is provided on an inner peripheral surface of the metal container 31. Inside the metal container 31, an insulating gas 35 such as a $SF_6$ gas is sealed.

Provision of the nonlinear resistive film 34 made of the nonlinear resistive coating material 20 by which an excellent nonlinear resistance characteristic can be obtained, on the inner peripheral surface of the metal container 31 makes it possible to suppress the movement of foreign substances existing on the surface layer of the nonlinear resistive film 34. Therefore, it becomes possible to make the design electric field of the metal container larger than that of a conventional closed insulating device and thereby make the metal container 31 compact.

Figure 4:
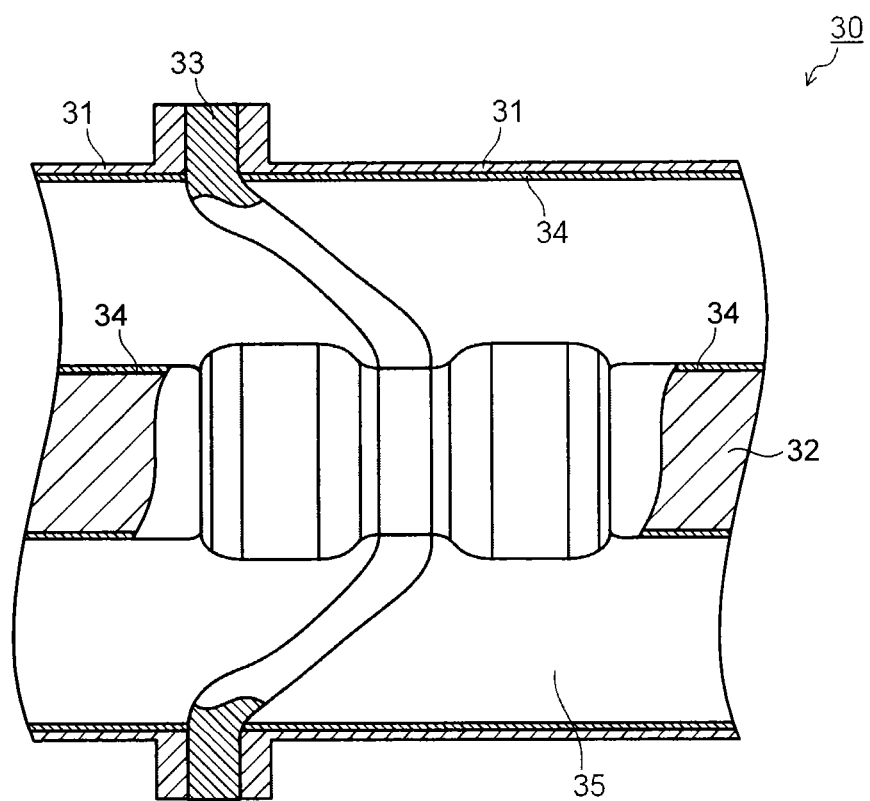
FIG. 4 is a view illustrating a closed insulating device in another structure formed with the nonlinear resistive film using the nonlinear resistive coating material in the embodiment with a part thereof illustrated in a cross section.

FIG. 4 is a view illustrating a closed insulating device 30 in another structure formed with a nonlinear resistive film 34 using the nonlinear resistive coating material 20 in the embodiment with a part thereof illustrated in a cross section. As illustrated in FIG. 4, the nonlinear resistive film 34 is provided on an inner peripheral surface of the metal container 31 and the nonlinear resistive film 34 may be provided on the surface of the high-voltage conductor 32.

The high-voltage conductor 32 is made of, for example, an aluminum material. Depending on the surface roughness of the aluminum material, an electric field concentrates on a projection on the surface to reduce the dielectric breakdown electric field. However, provision of the nonlinear resistive film 34 on the surface of the high-voltage conductor 32 as described above makes it possible to reduce the resistance only of the surroundings of the projection on the surface. Therefore, the electric field concentration is relaxed and the dielectric breakdown electric field increases.

Note that the nonlinear resistive film 34 only needs to be provided either on the inner peripheral surface of the metal container 31 and the surface of the high-voltage conductor 32.

Figure 5:
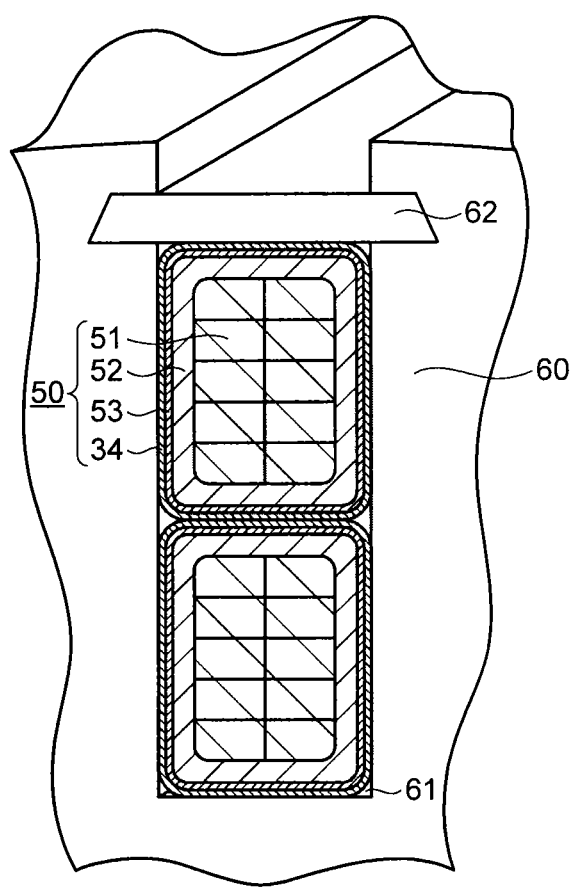
FIG. 5 is a view illustrating a state that a stator coil of a power generator formed with the nonlinear resistive film using the nonlinear resistive coating material in the embodiment is housed in an iron core slot.
Figure 6:
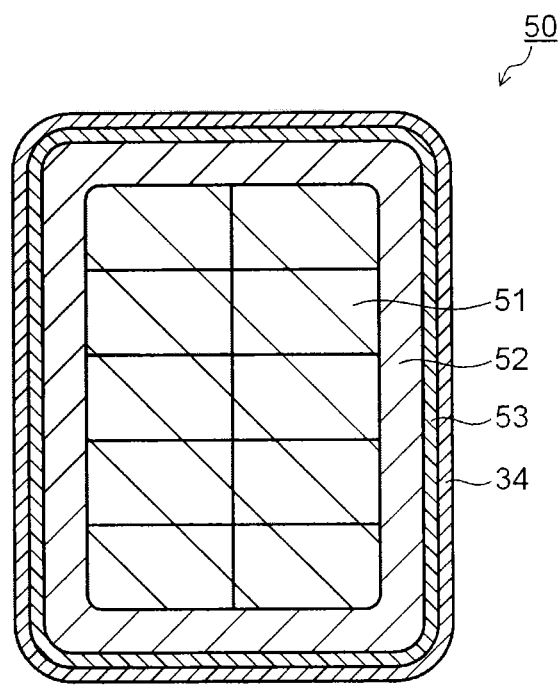
FIG. 6 is an enlarged view illustrating the cross section of the stator coil illustrated in FIG. 5.

The nonlinear resistive film 34 can also be used, for example, for a stator coil of a power generator, in addition to use in the above-described closed insulating device 30. FIG. 5 is a view illustrating a state that a stator coil 50 of a power generator formed with the nonlinear resistive film 34 using the nonlinear resistive coating material 20 in the embodiment is housed in an iron core slot 61. Note that the stator coil 50 is illustrated in a cross section perpendicular to the longitudinal direction in FIG. 5. FIG. 6 is a view made by enlarging the cross section of the stator coil 50 illustrated in FIG. 5.

As illustrated in FIG. 5, stator coils 50 are housed in the iron core slot 61 formed in an iron core 60. Here, an example is illustrated in which two stator coils 50 stacked in a radial direction are fixed in the iron core slot 61 with a wedge 62.

As illustrated in FIG. 6, the stator coil 50 includes a coil conductor 51 made of a conductor, a main insulating layer 52 provided to cover an outer peripheral surface of the coil conductor 51, and an electric field relaxation layer 53 provided to cover an outer peripheral surface of the main insulating layer 52. The electric field relaxation layer 53 is formed by winding a sheet-shaped electric field relaxation material around an outer peripheral surface of the main insulating layer 52. Further, the stator coil 50 includes the nonlinear resistive film 34 provided to cover an outer peripheral surface of the electric field relaxation layer 53.

The nonlinear resistive film 34 is formed by applying the nonlinear resistive coating material 20 to the outer peripheral surface of the electric field relaxation layer 53, for example, using a brush or the like. Further, the nonlinear resistive film 34 is formed by spray painting the nonlinear resistive coating material 20 to the outer peripheral surface of the electric field relaxation layer 53, for example, using a spray or the like.

Provision of the nonlinear resistive film 34 as described above improves the electric field relaxation effect, thereby making it possible to suppress the creeping discharge, for example, at an end portion of the stator coil 50.

Note that the example in which the nonlinear resistive film 34 is formed on the outer peripheral surface of the electric field relaxation layer 53 is illustrated here, and the nonlinear resistive film 34 may be formed between the main insulating layer 52 and the electric field relaxation layer 53. Further, the nonlinear resistive film 34 may be formed on the outer peripheral surface of the main insulating layer 52 without forming the electric field relaxation layer 53.

The closed insulating device (bus) and the stator coil 50 of the power generator have been illustrated and described as examples of the electric equipment in the above, and the nonlinear resistive coating material in the embodiment is applicable to, for example, various kinds of electric equipment, electronic equipment, industrial equipment, heavy electrical equipment. The same operations and effects as described above can be obtained also in the case of applying the nonlinear resistive coating material to them.

As described above, according to the nonlinear resistive coating material 20 in the embodiment, uniformly dispersing the ZnO-containing particles 21 and the surface-treated whiskers 10 in the matrix resin 22 makes it possible to ensure an excellent conductive path 23. Thereby, an excellent nonlinear resistance characteristic can be obtained.

(Evaluation of Nonlinear Resistance Characteristic)

Next, the fact that nonlinear resistive coating material in the embodiment has an excellent nonlinear resistance characteristic will be described.

(Effect of Titanate Coupling Surface Modification Treatment)

1. In the Case of Using the Epoxy Resin as the Matrix Resin 22

(1) Addition of the Surface-Treated Whiskers 10

To evaluate the nonlinear resistance characteristic, the nonlinear resistive coating material 20 was produced as follows.

First, part of the liquid epoxy resin to be compounded (for example, about 50 mass % of the total compounding amount of the epoxy resin) and 10 parts by mass of the surface-treated whiskers 10 to 100 parts by mass of the epoxy resin (the total compounding amount of the epoxy resin) were stirred by a rotation and revolution mixer to produce a masterbatch. Note that in this event, an appropriate amount of a dimethyl silicone-based defoaming agent (for example, product name: TSA720 or the like) was added.

Here, as the epoxy resin, EPOFIX (manufactured by Marumoto Struers K.K.) being the bisphenol A type epoxy resin that is the two-part epoxy resin was used. For the surface treatment for the whiskers 10, PLENACT KR55 (Ajinomoto Fine-Techno Co., Inc.)) being tetra(2,2-diallyloxymethyl-1-butyl)-bis(ditridecyl)phosphite titanate was used. Further, the compounding amount of the titanate coupling agent was set to 1 part by mass to 100 parts by mass of the whiskers made of ZnO not subjected to titanate coupling surface modification treatment. Further, the whiskers 10 each having a length L of the needle crystal part 12 of 2 μm to 50 μm and a mean diameter D of a portion having the maximum diameter of the needle crystal part 12 of 3 μm was used.

Subsequently, the remainder of the epoxy resin and a predetermined amount of ZnO-containing particles 21 were added to the masterbatch, and they were stirred by a rotation and revolution mixer or the like. Here, as the ZnO-containing particles 21, particles made of a sintered compact containing ZnO as a main component and a metal oxide such as $Bi_2O_3$, $Co_2O_3$, MnO, $Sb_2O_3$, or NiO as a sub-component were used. The average particle size of the ZnO-containing particles 21 was 30 μm. Further, three kinds of mixtures were produced in which the contents of the ZnO-containing particles 21 were 43 parts by mass, 63 parts by mass, and 89 parts by mass to 100 parts by mass of the epoxy resin (the total compounding amount of the epoxy resin).

Subsequently, a predetermined amount of the curing agent that cures the epoxy resin and a diluting solvent were added to each of the mixtures, and they were stirred by a rotation and revolution mixer or the like. Here, EPOFIX HARDNER (manufactured by Marumoto Struers K.K.) being triethylenetetramine was used as the curing agent, and Tect EP thinner (Kansai Paint Co., Ltd.) was used as the diluting solvent.

In the above manner, three kinds of nonlinear resistive coating materials 20 were produced. Here, the nonlinear resistive coating material 20 containing 43 parts by mass of the ZnO-containing particles 21 to 100 parts by mass of the epoxy resin (the total compounding amount of the epoxy resin) is Sample 1, the nonlinear resistive coating material 20 containing 63 parts by mass is Sample 2, and the nonlinear resistive coating material 20 containing 89 parts by mass is Sample 3.

Further, for comparison, nonlinear resistive coating materials made by adding the whiskers not subjected to surface treatment (hereinafter, referred to as untreated whiskers) in place of the surface-treated whiskers 10 in the above-described three kinds of nonlinear resistive coating materials 20 were also produced. Note that in these coating materials, the configurations other than addition of the untreated whiskers are the same as those of the above-described three kinds of nonlinear resistive coating materials 20 (Sample 1 to Sample 3).

Here, the nonlinear resistive coating material having the untreated whiskers added thereto and containing 43 parts by mass of the ZnO-containing particles 21 to 100 parts by mass of the epoxy resin (the total compounding amount of the epoxy resin) is Sample 4, the nonlinear resistive coating material containing 63 parts by mass is Sample 5, and the nonlinear resistive coating material containing 89 parts by mass is Sample 6.

Figure 7:
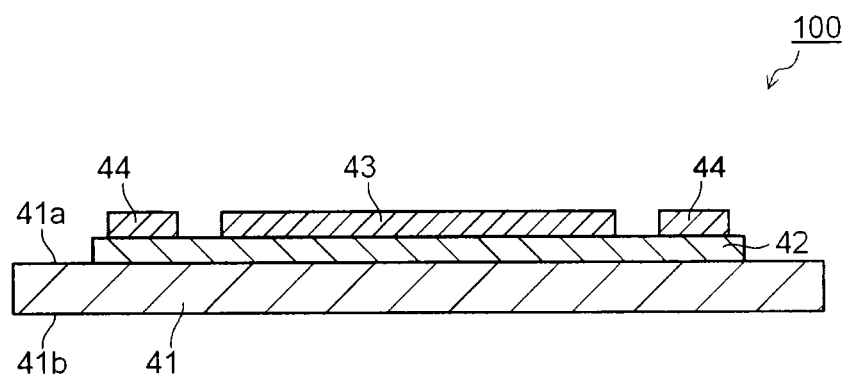
FIG. 7 is a view illustrating a cross section of a test member for evaluation of a nonlinear resistance characteristic.

Next, test members 100 for evaluation of the nonlinear resistance characteristics were produced using the above-described Sample 1 to Sample 6 as follows. FIG. 7 is a view illustrating a cross section of the test member 100 for evaluation of the nonlinear resistance characteristic.

First, Teflon (registered trademark) with a hole of a diameter of 60 mm provided at its center and having a thickness of 130 μm was placed on one surface 41a of an aluminum plate 41 having a thickness of 3 mm, a length of 70 mm, and a width of 70 mm, to thereby mask it. Subsequently, the samples (Sample 1 to Sample 6) were each applied to the hole at the center of Teflon (registered trademark) by an airless spray and cured at room temperature for 24 hours. Thus, a nonlinear resistive layer 42 having a diameter of 60 mm and a thickness of 100 μm was formed.

Subsequently, a conductive paste was applied to the surface of the nonlinear resistive layer 42 to produce an electrode 43 in a circular shape having a diameter of 38 mm and an electrode 44 having an outer diameter of 50 mm with a gap of 1 mm around the electrode 43. Note that another surface 41b of the aluminum plate 41 was made to function as an electrode. Here, the electrode 44 and the another surface 41b of the aluminum plate 41 are ground electrodes. After the formation of the electrodes, Teflon (registered trademark) was removed.

Through the above-described processes, 6 kinds of test members (Test Member 1 to Test Member 6) were produced. Note that the test member using Sample 1 is Test Member 1, the test member using Sample 2 is Test Member 2, the test member using Sample 3 is Test Member 3, the test member using Sample 4 is Test Member 4, the test member using Sample 5 is Test Member 5, and the test member using Sample 6 is Test Member 6.

Figure 8:
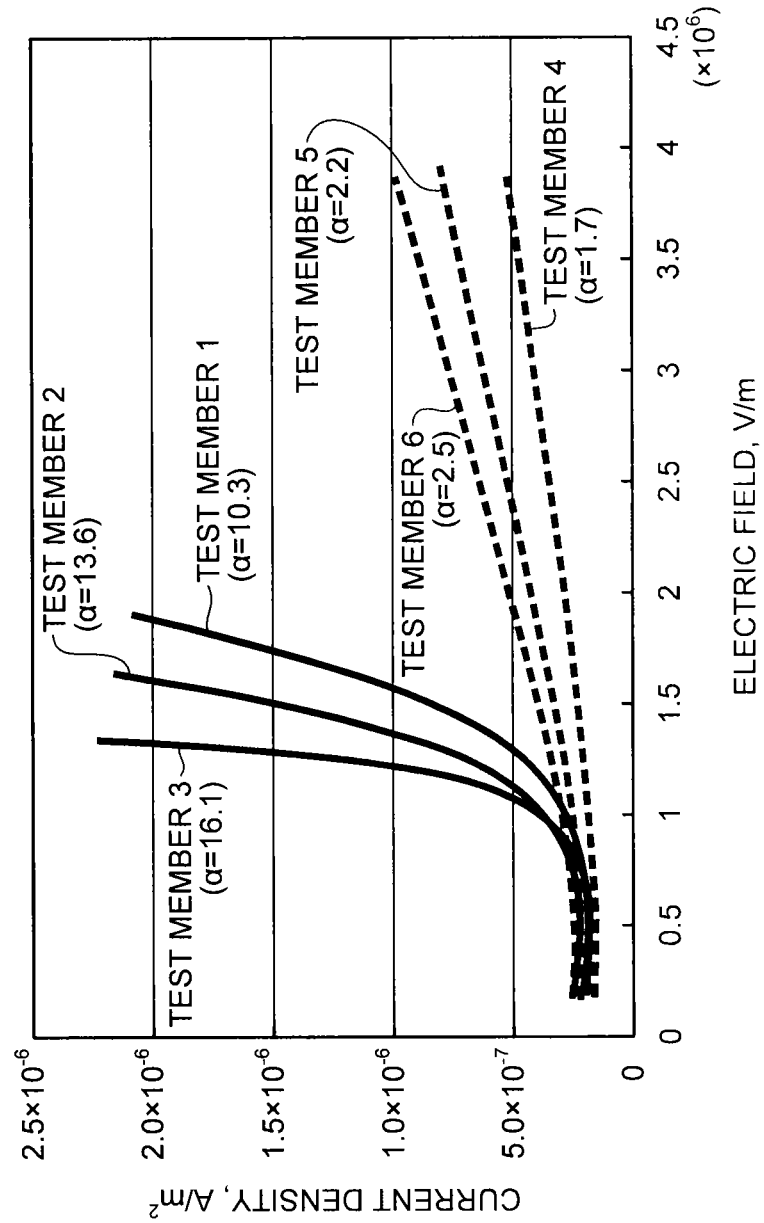
FIG. 8 is a chart illustrating results of evaluation tests of the nonlinear resistance characteristics when the epoxy resin was used as the matrix resin.

A current in a range of 0.06 mA to 0.6 mA was passed between the electrodes of each of the test members (Test Member 1 to Test Member 6) using an AC power supply, and their nonlinear resistance characteristics were evaluated. FIG. 8 is a chart illustrating results of evaluation tests of the nonlinear resistance characteristics when the epoxy resin was used as the matrix resin 22.

Here, as the evaluation criterion of the nonlinear resistance characteristic, a nonlinear index α was used. A larger nonlinear index α indicates a better nonlinear resistance characteristic. Further, the criterion of the nonlinear resistance characteristic being exhibited is that the nonlinear index α is 5 or more.

The nonlinear index α was evaluated at two electric field values where a measured current was 0.10 mA and 0.06 mA. The relationship among a current value (I), an electric field value (E), and a nonlinear index α expressed using a constant (K) is expressed as in the following Expression (1).

[Math. 1]

$$I = K \cdot E^\alpha \quad \text{(Expression 1)}$$

Expression (1) can be transformed into Expression (2). Expression (2) transformed by taking the logarithm of both sides is Expression (3).

[Math. 2]

$$I_1 = I_2(E_1/E_2)^\alpha \quad \text{(Expression 2)}$$

-continued

[Math. 3]

$$\alpha = \frac{\log I_1 - \log I_2}{\log E_1 - \log E_2} \quad \text{(Expression 3)}$$

In Expression (2) and Expression (3), a current density was $I_1$ (A/m$^2$) and an electric field was $E_1$ (V/m) when a measured current value was 0.10 mA, and a current density was $I_2$ (A/m$^2$) and an electric field was $E_2$ (V/m) when a measured current value was 0.60 mA. The nonlinear index α was calculated using the above-described Expression (3).

As illustrated in FIG. 8, Test Member 1 to Test Member 3 have current-electric field curves rising rapidly and values of the nonlinear index α of 5 or more, and are thus found to have superior nonlinear resistance characteristics. In contrast to them, Test Member 4 to Test Member 6 have current-electric field curves rising slowly and values of the nonlinear index α of less than 5 and are thus found to be inferior in nonlinear resistance characteristic.

Note that though not illustrated here, the above-described superior nonlinear resistance characteristic has been confirmed in the case of containing 5 parts by mass or more of the surface-treated whiskers 10 to 100 parts by mass of the epoxy resin (the total compounding amount of the epoxy resin). Further, in terms of workability, the content of the surface-treated whiskers 10 is preferably 30 parts by mass or less to 100 parts by mass of the epoxy resin (the total compounding amount of the epoxy resin), and the above-described superior nonlinear resistance characteristic has been confirmed also in the case of containing 30 parts by mass of the surface-treated whiskers 10.

(2) Addition of the Surface-Treated Whiskers 10 and the Dispersing Agent

Here, about the case where the surface-treated whiskers 10 and the dispersing agent were added, the same evaluation as in the case where the surface-treated whiskers 10 were added described in the above 1.(1) was performed.

Except the addition of the dispersing agent together with the surface-treated whiskers 10, the same manufacturing method as those for the above-described Sample 1 to Sample 3 was used when producing a masterbatch. As the dispersing agent, Homogenol L-18 being the polycarboxylic acid type high molecular surface active agent was used. 1 part by mass of the dispersing agent was added to 100 parts by mass of the epoxy resin (the total compounding amount of the epoxy resin).

Here, the nonlinear resistive coating material 20 containing 43 parts by mass of the ZnO-containing particles 21 to 100 parts by mass of the epoxy resin (the total compounding amount of the epoxy resin) is Sample 7, the nonlinear resistive coating material 20 containing 63 parts by mass is Sample 8, and the nonlinear resistive coating material 20 containing 89 parts by mass is Sample 9.

Further, for comparison, nonlinear resistive coating materials made by adding the untreated whiskers in place of the surface-treated whiskers 10 in the above-described three kinds of nonlinear resistive coating materials 20 were also produced. Note that in these coating materials, the configurations other than addition of the untreated whiskers are the same as those of the above-described three kinds of nonlinear resistive coating materials 20 (Sample 7 to Sample 9).

Here, the nonlinear resistive coating material having the untreated whiskers added thereto and containing 43 parts by mass of the ZnO-containing particles 21 to 100 parts by mass of the epoxy resin (the total compounding amount of the epoxy resin) is Sample 10, the nonlinear resistive coating material containing 63 parts by mass is Sample 11, and the nonlinear resistive coating material containing 89 parts by mass is Sample 12.

Next, test members 100 for evaluation of the nonlinear resistance characteristics were produced using the above-described Sample 7 to Sample 12 by the same method as the method described in the above 1. (1) (see FIG. 7). Note that the test member using Sample 7 is Test Member 7, the test member using Sample 8 is Test Member 8, the test member using Sample 9 is Test Member 9, the test member using Sample 10 is Test Member 10, the test member using Sample 11 is Test Member 11, and the test member using Sample 12 is Test Member 12.

Figure 9:
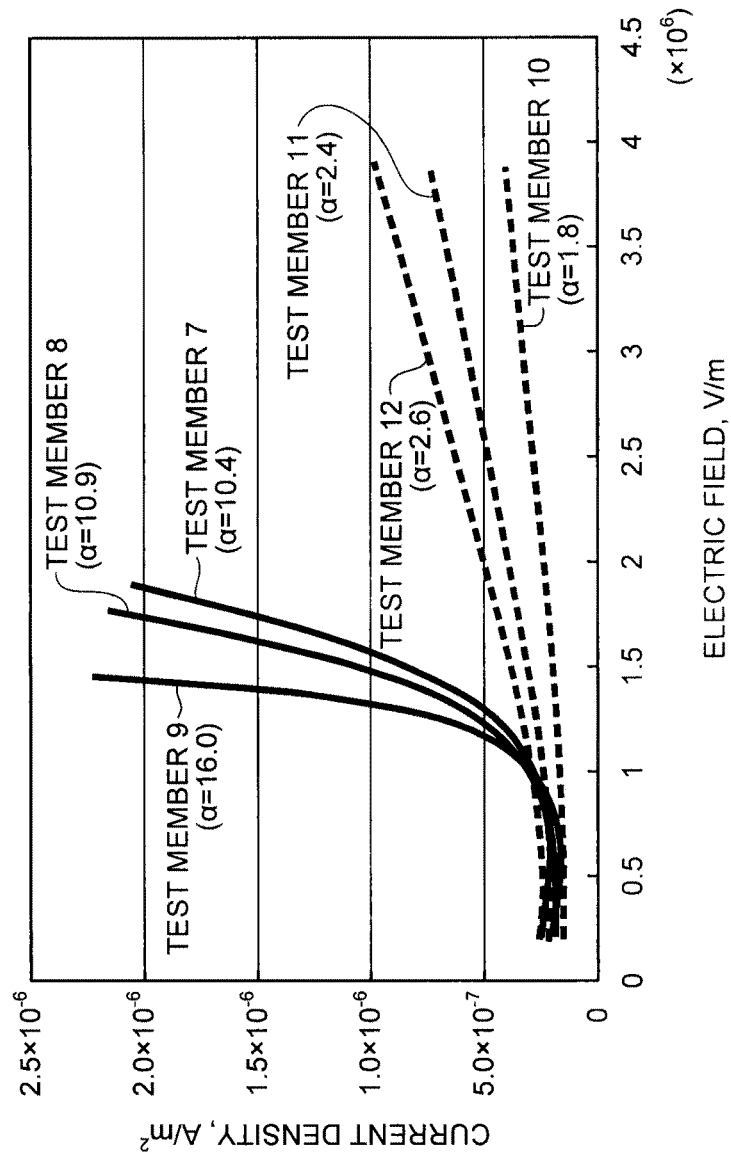
FIG. 9 is a chart illustrating results of evaluation tests of the nonlinear resistance characteristics when the epoxy resin was used as the matrix resin.

Using the test members (Test Member 7 to Test Member 12), their nonlinear resistance characteristics were evaluated by the same method as that described in the above 1.(1). FIG. 9 is a chart illustrating results of evaluation tests of the nonlinear resistance characteristics when the epoxy resin was used as the matrix resin 22.

As illustrated in FIG. 9, Test Member 7 to Test Member 9 have current-electric field curves rising rapidly and values of the nonlinear index α of 5 or more and are thus found to have superior nonlinear resistance characteristics. In contrast to them, Test Member 10 to Test Member 12 have current-electric field curves rising slowly and values of the nonlinear index α of less than 5 and are thus found to be inferior in nonlinear resistance characteristic.

Note that though not illustrated here, the above-described superior nonlinear resistance characteristic has been confirmed in the case of containing 5 parts by mass or more of the surface-treated whiskers 10 to 100 parts by mass of the epoxy resin (the total compounding amount of the epoxy resin). Further, in terms of workability, the content of the surface-treated whiskers 10 is preferably 30 parts by mass or less to 100 parts by mass of the epoxy resin (the total compounding amount of the epoxy resin), and the above-described superior nonlinear resistance characteristic has been confirmed also in the case of containing 30 parts by mass of the surface-treated whiskers 10.

(3) Addition of the Surface-Treated Whiskers 10 and the Antisettling Agent

Here, about the case where the surface-treated whiskers 10 and the antisettling agent were added, the same evaluation as in the case where the surface-treated whiskers 10 were added described in the above 1.(1) was performed.

Except the addition of the antisettling agent together with the surface-treated whiskers 10, the same manufacturing method as those for the above-described Sample 1 to Sample 3 was used when producing a masterbatch. As the antisettling agent, alumina Aerosil having an average particle size of 23 nm was used. 1 part by mass of the antisettling agent was added to 100 parts by mass of the epoxy resin (the total compounding amount of the epoxy resin).

Here, the nonlinear resistive coating material 20 containing 43 parts by mass of the ZnO-containing particles 21 to 100 parts by mass of the epoxy resin (the total compounding amount of the epoxy resin) is Sample 13, the nonlinear resistive coating material 20 containing 63 parts by mass is Sample 14, and the nonlinear resistive coating material 20 containing 89 parts by mass is Sample 15.

Further, for comparison, nonlinear resistive coating materials made by adding the untreated whiskers in place of the surface-treated whiskers 10 in the above-described three kinds of nonlinear resistive coating materials 20 were also produced. Note that in these coating materials, the configurations other than addition of the untreated whiskers are the same as those of the above-described three kinds of nonlinear resistive coating materials 20 (Sample 13 to Sample 15).

Here, the nonlinear resistive coating material having the untreated whiskers added thereto and containing 43 parts by mass of the ZnO-containing particles 21 to 100 parts by mass of the epoxy resin (the total compounding amount of the epoxy resin) is Sample 16, the nonlinear resistive coating material containing 63 parts by mass is Sample 17, and the nonlinear resistive coating material containing 89 parts by mass is Sample 18.

Next, test members 100 for evaluation of the nonlinear resistance characteristics were produced using the above-described Sample 13 to Sample 18 by the same method as the method described in the above 1.(1) (see FIG. 7). Note that the test member using Sample 13 is Test Member 13, the test member using Sample 14 is Test Member 14, the test member using Sample 15 is Test Member 15, the test member using Sample 16 is Test Member 16, the test member using Sample 17 is Test Member 17, and the test member using Sample 18 is Test Member 18.

Figure 10:
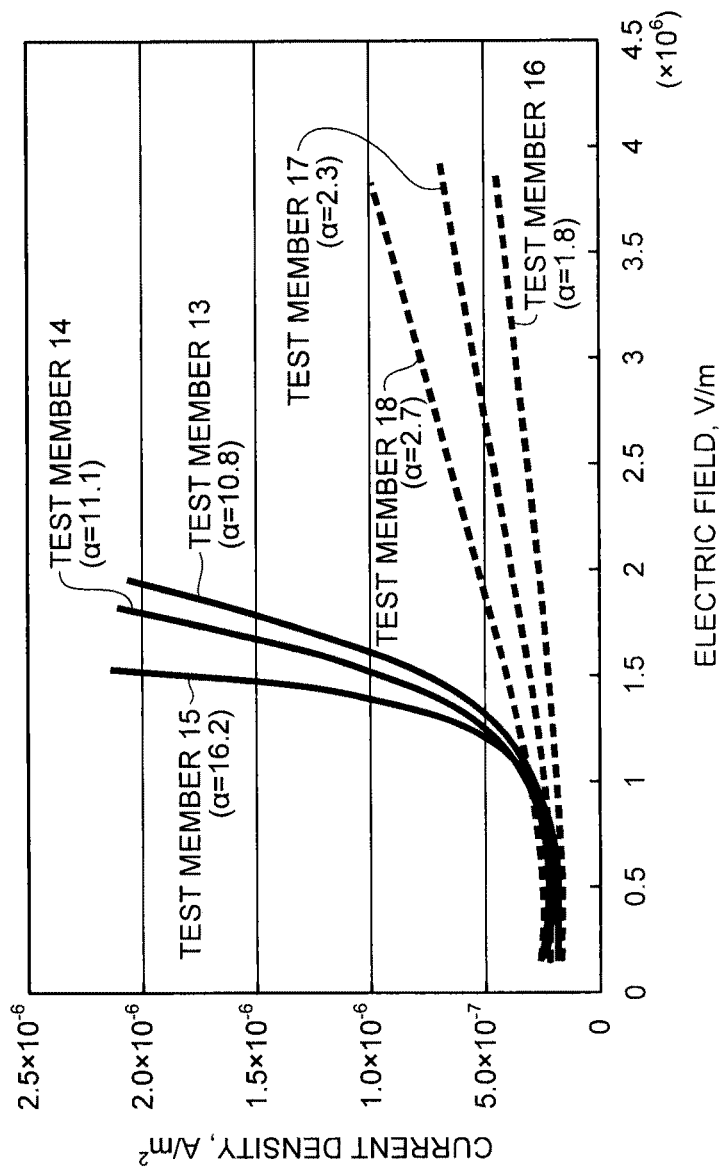
FIG. 10 is a chart illustrating results of evaluation tests of the nonlinear resistance characteristics when the epoxy resin was used as the matrix resin.

Using the test members (Test Member 13 to Test Member 18), their nonlinear resistance characteristics were evaluated by the same method as that described in the above 1.(1). FIG. 10 is a chart illustrating results of evaluation tests of the nonlinear resistance characteristics when the epoxy resin was used as the matrix resin 22.

As illustrated in FIG. 10, Test Member 13 to Test Member 15 have current-electric field curves rising rapidly and values of the nonlinear index α of 5 or more and are thus found to have superior nonlinear resistance characteristics. In contrast to them, Test Member 16 to Test Member 18 have current-electric field curves rising slowly and values of the nonlinear index α of less than 5 and are thus found to be inferior in nonlinear resistance characteristic.

Note that though not illustrated here, the above-described superior nonlinear resistance characteristic has been confirmed in the case of containing 5 parts by mass or more of the surface-treated whiskers 10 to 100 parts by mass of the epoxy resin (the total compounding amount of the epoxy resin). Further, in terms of workability, the content of the surface-treated whiskers 10 is preferably 30 parts by mass or less to 100 parts by mass of the epoxy resin (the total compounding amount of the epoxy resin), and the above-described superior nonlinear resistance characteristic has been confirmed also in the case of containing 30 parts by mass of the surface-treated whiskers 10.

Further, also in the case of adding both of the dispersing agent and the antisettling agent, samples using the surface-treated whiskers 10 have been confirmed to have superior nonlinear resistance characteristics similar to the above-described nonlinear resistance characteristics.

2. In the Case of Using the Acrylic Resin or the Polyurethane Resin as the Matrix Resin 22

In the above, the cases of the addition of the surface-treated whiskers 10, the addition of the surface-treated whiskers 10 and the dispersing agent, and the addition of the surface-treated whiskers 10 and the antisettling agent, using the epoxy resin as the matrix resin 22, have been described. Furthermore, a superior nonlinear resistance characteristic was confirmed also in the case of using the acrylic resin or the polyurethane resin as the matrix resin 22 as described below.

(1) Addition of the Surface-Treated Whiskers 10

About the case where the acrylic resin or the polyurethane resin was used as the matrix resin 22, the same evaluation as that in the case where the epoxy resin was used as the matrix resin 22 described in the above 1.(1) was performed.

Here, ARMATEX (manufactured by Mitsui Chemicals Inc.) being methacrylic acid adduct of bisphenol A diglycidyl ether was used as a liquid acrylic resin, and PAN DI A (manufactured by DIC Corporation) being a polymer of dioctyladipate and ethylene glycol was used as a liquid polyurethane resin. Note that the acrylic resin and the polyurethane resin are cured by heating, and therefore any curing agent was not added. Therefore, samples were each applied to the one surface 41a of the aluminum plate 41 by an airless spray as described above and then heated at 120° C. for 30 minutes so that the resin was cured. Except them, the same methods as the manufacturing method of the nonlinear resistive coating material 20 and the evaluation method of the nonlinear resistance characteristic as those described in the above 1.(1) were used.

Here, the nonlinear resistive coating material 20 containing 43 parts by mass of the ZnO-containing particles 21 to 100 parts by mass of the acrylic resin (the total compounding amount of the acrylic resin) is Sample 19, the nonlinear resistive coating material 20 containing 63 parts by mass is Sample 20, and the nonlinear resistive coating material 20 containing 89 parts by mass is Sample 21.

Further, for comparison, nonlinear resistive coating materials made by adding the untreated whiskers in place of the surface-treated whiskers 10 in the above-described three kinds of nonlinear resistive coating materials 20 were also produced. Note that in these coating materials, the configurations other than addition of the untreated whiskers are the same as those of the above-described three kinds of nonlinear resistive coating materials 20 (Sample 19 to Sample 21).

Here, the nonlinear resistive coating material having the untreated whiskers added thereto and containing 43 parts by mass of the ZnO-containing particles 21 to 100 parts by mass of the acrylic resin (the total compounding amount of the acrylic resin) is Sample 22, the nonlinear resistive coating material containing 63 parts by mass is Sample 23, and the nonlinear resistive coating material containing 89 parts by mass is Sample 24.

Test members 100 for evaluation of the nonlinear resistance characteristics were produced using the above-described Sample 19 to Sample 24 by the same method as the method described in the above 1.(1) (see FIG. 7). Note that the test member using Sample 19 is Test Member 19, the test member using Sample 20 is Test Member 20, the test member using Sample 21 is Test Member 21, the test member using Sample 22 is Test Member 22, the test member using Sample 23 is Test Member 23, and the test member using Sample 24 is Test Member 24.

Further, the nonlinear resistive coating material 20 containing 43 parts by mass of the ZnO-containing particles 21 to 100 parts by mass of the polyurethane resin (the total compounding amount of the polyurethane resin) is Sample 25, the nonlinear resistive coating material 20 containing 63 parts by mass is Sample 26, and the nonlinear resistive coating material 20 containing 89 parts by mass is Sample 27.

Further, for comparison, nonlinear resistive coating materials made by adding the untreated whiskers in place of the surface-treated whiskers 10 in the above-described three kinds of nonlinear resistive coating materials 20 were also produced. Note that in these coating materials, the configurations other than addition of the untreated whiskers are the same as those of the above-described three kinds of nonlinear resistive coating materials 20 (Sample 25 to Sample 27).

Here, the nonlinear resistive coating material having the untreated whiskers added thereto and containing 43 parts by mass of the ZnO-containing particles 21 to 100 parts by mass of the polyurethane resin (the total compounding amount of the polyurethane resin) is Sample 28, the nonlinear resistive coating material containing 63 parts by mass is Sample 29, and the nonlinear resistive coating material containing 89 parts by mass is Sample 30.

Test members 100 for evaluation of the nonlinear resistance characteristics were produced using the above-described Sample 25 to Sample 30 by the same method as the method described in the above 1.(1) (see FIG. 7). Note that the test member using Sample 25 is Test Member 25, the test member using Sample 26 is Test Member 26, the test member using Sample 27 is Test Member 27, the test member using Sample 28 is Test Member 28, the test member using Sample 29 is Test Member 29, and the test member using Sample 30 is Test Member 30.

Figure 11:
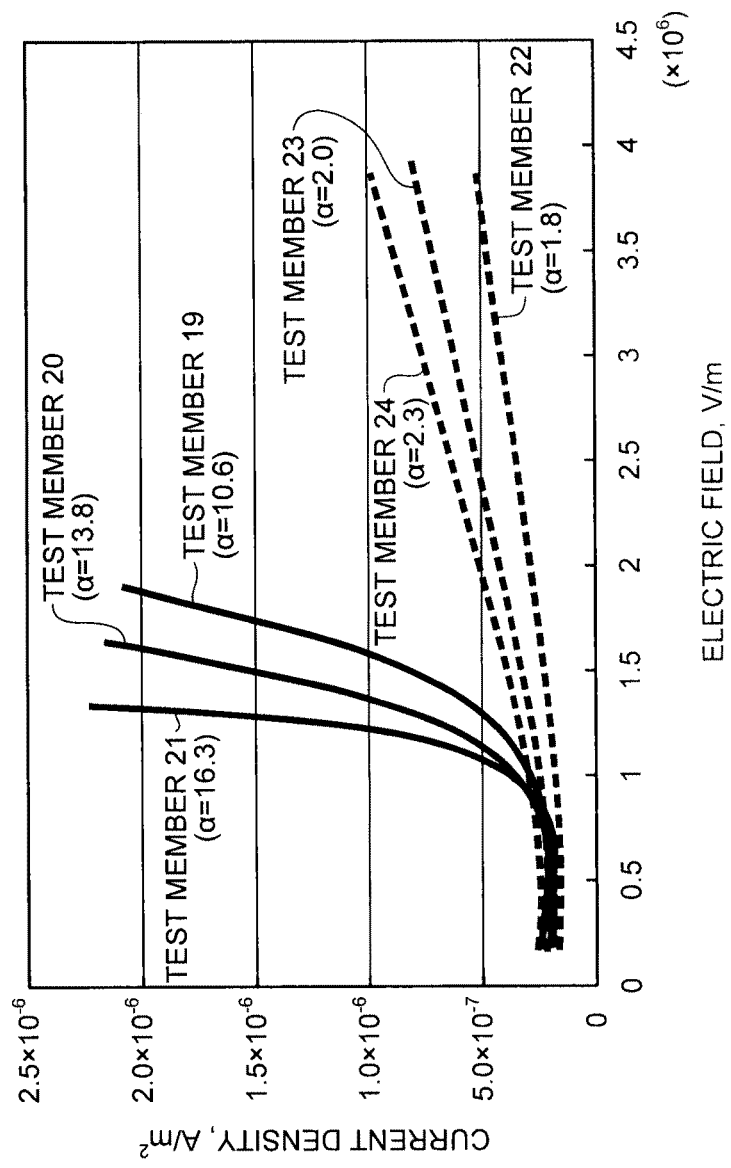
FIG. 11 is a chart illustrating results of evaluation tests of the nonlinear resistance characteristics when the acrylic resin was used as the matrix resin.
Figure 12:
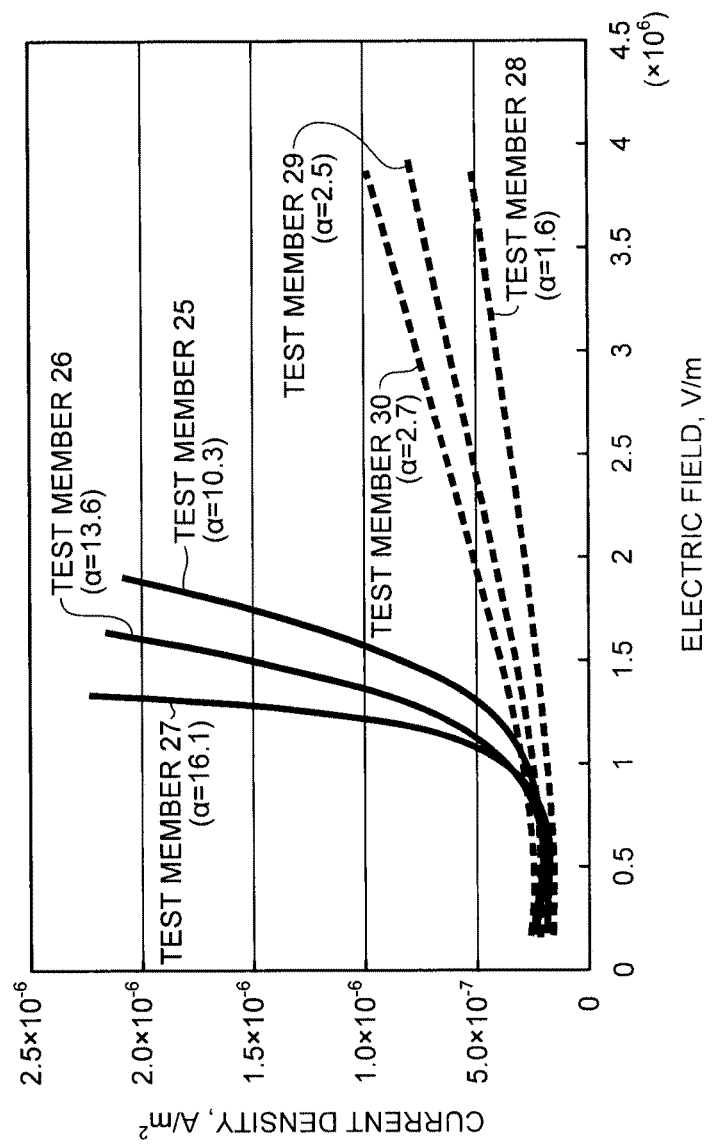
FIG. 12 is a chart illustrating results of evaluation tests of the nonlinear resistance characteristics when the polyurethane resin was used as the matrix resin.

Using the test members (Test Member 19 to Test Member 30), their nonlinear resistance characteristics were evaluated by the same method as that described in the above 1.(1). FIG. 11 is a chart illustrating results of evaluation tests of the nonlinear resistance characteristics when the acrylic resin was used as the matrix resin 22. FIG. 12 is a chart illustrating results of evaluation tests of the nonlinear resistance characteristics when the polyurethane resin was used as the matrix resin 22.

As illustrated in FIG. 11 and FIG. 12, Test Member 19 to Test Member 21 and Test Member 25 to Test Member 27 have current-electric field curves rising rapidly and values of the nonlinear index α of 5 or more and are thus found to have superior nonlinear resistance characteristics. In contrast to them, Test Member 22 to Test Member 24 and Test Member 28 to Test Member 30 have current-electric field curves rising slowly and values of the nonlinear index α of less than 5 and are thus found to be inferior in nonlinear resistance characteristic.

Note that though not illustrated here, the above-described superior nonlinear resistance characteristic has been confirmed in the case of containing 5 parts by mass or more of the surface-treated whiskers 10 to 100 parts by mass of the acrylic resin (the total compounding amount of the acrylic resin) or to 100 parts by mass of the polyurethane resin (the total compounding amount of the polyurethane resin). Further, in terms of workability, the content of the surface-treated whiskers 10 is preferably 30 parts by mass or less to 100 parts by mass of the acrylic resin (the total compounding amount of the acrylic resin) or to 100 parts by mass of the polyurethane resin (the total compounding amount of the polyurethane resin), and the above-described superior nonlinear resistance characteristic has been confirmed also in the case of containing 30 parts by mass of the surface-treated whiskers 10.

(2) Addition of the surface-treated whiskers 10 and the dispersing agent Here, about the case where the surface-treated whiskers 10 and the dispersing agent were added, the same evaluation as in the case where the surface-treated whiskers 10 were added described in the above 2.(1) was performed.

Except the addition of the dispersing agent together with the surface-treated whiskers 10, the same manufacturing method as those for the above-described Sample 19 to Sample 21 and Sample 25 to Sample 27 was used when producing a masterbatch. As the dispersing agent, Homogenol L-18 being the polycarboxylic acid type high molecular surface active agent was used. 1 part by mass of the dispersing agent was added to 100 parts by mass of the acrylic resin (the total compounding amount of the acrylic resin) or to 100 parts by mass of the polyurethane resin (the total compounding amount of the polyurethane resin).

Here, the nonlinear resistive coating material 20 containing 43 parts by mass of the ZnO-containing particles 21 to 100 parts by mass of the acrylic resin (the total compounding amount of the acrylic resin) is Sample 31, the nonlinear resistive coating material 20 containing 63 parts by mass is Sample 32, and the nonlinear resistive coating material 20 containing 89 parts by mass is Sample 33.

Further, for comparison, nonlinear resistive coating materials made by adding the untreated whiskers in place of the surface-treated whiskers 10 in the above-described three kinds of nonlinear resistive coating materials 20 were also produced. Note that in these coating materials, the configurations other than addition of the untreated whiskers are the same as those of the above-described three kinds of nonlinear resistive coating materials 20 (Sample 31 to Sample 33).

Here, the nonlinear resistive coating material having the untreated whiskers added thereto and containing 43 parts by mass of the ZnO-containing particles 21 to 100 parts by mass of the acrylic resin (the total compounding amount of the acrylic resin) is Sample 34, the nonlinear resistive coating material containing 63 parts by mass is Sample 35, and the nonlinear resistive coating material containing 89 parts by mass is Sample 36.

Test members 100 for evaluation of the nonlinear resistance characteristics were produced using the above-described Sample 31 to Sample 36 by the same method as the method described in the above 1.(1) (see FIG. 7). Note that the test member using Sample 31 is Test Member 31, the test member using Sample 32 is Test Member 32, the test member using Sample 33 is Test Member 33, the test member using Sample 34 is Test Member 34, the test member using Sample 35 is Test Member 35, and the test member using Sample 36 is Test Member 36.

Further, the nonlinear resistive coating material 20 containing 43 parts by mass of the ZnO-containing particles 21 to 100 parts by mass of the polyurethane resin (the total compounding amount of the polyurethane resin) is Sample 37, the nonlinear resistive coating material 20 containing 63 parts by mass is Sample 38, and the nonlinear resistive coating material 20 containing 89 parts by mass is Sample 39.

Further, for comparison, nonlinear resistive coating materials made by adding the untreated whiskers in place of the surface-treated whiskers 10 in the above-described three kinds of nonlinear resistive coating materials 20 were also produced. Note that in these coating materials, the configurations other than addition of the untreated whiskers are the same as those of the above-described three kinds of nonlinear resistive coating materials 20 (Sample 37 to Sample 39).

Here, the nonlinear resistive coating material having the untreated whiskers added thereto and containing 43 parts by mass of the ZnO-containing particles 21 to 100 parts by mass of the polyurethane resin (the total compounding amount of the polyurethane resin) is Sample 40, the nonlinear resistive coating material containing 63 parts by mass is Sample 41, and the nonlinear resistive coating material containing 89 parts by mass is Sample 42.

Test members 100 for evaluation of the nonlinear resistance characteristics were produced using the above-described Sample 37 to Sample 42 by the same method as the method described in the above 1.(1) (see FIG. 7). Note that the test member using Sample 37 is Test Member 37, the test member using Sample 38 is Test Member 38, the test member using Sample 39 is Test Member 39, the test member using Sample 40 is Test Member 40, the test member using Sample 41 is Test Member 41, and the test member using Sample 42 is Test Member 42.

Figure 13:
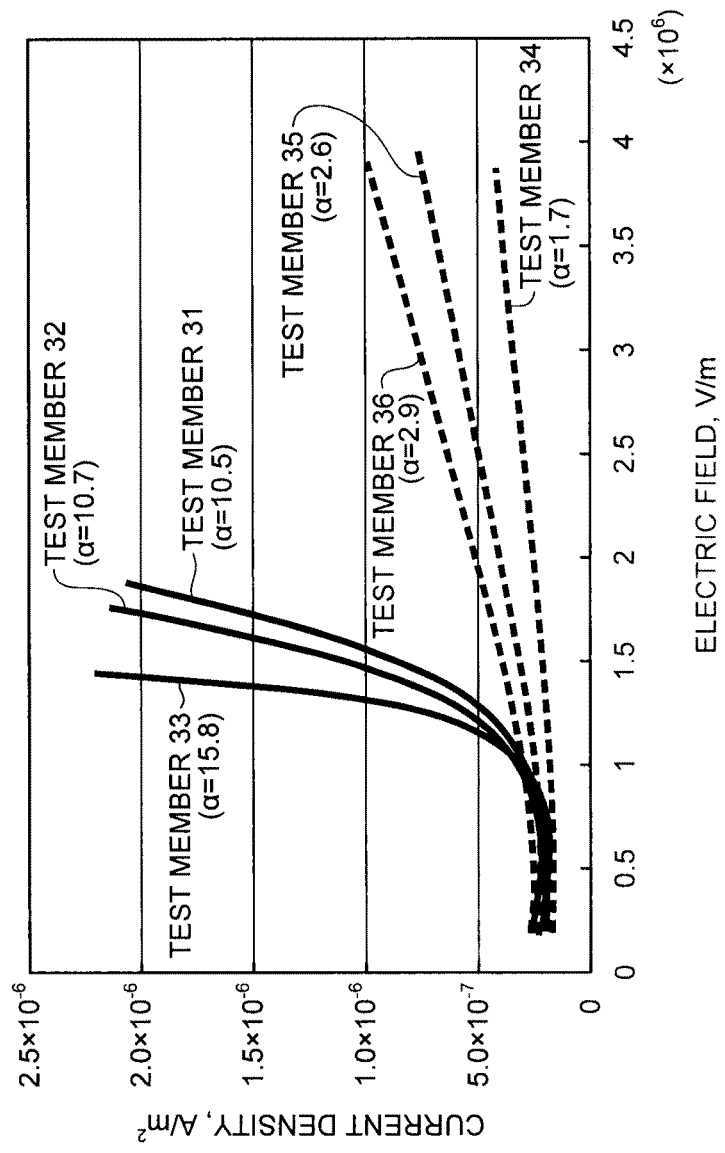
FIG. 13 is a chart illustrating results of evaluation tests of the nonlinear resistance characteristics when the acrylic resin was used as the matrix resin.
Figure 14:
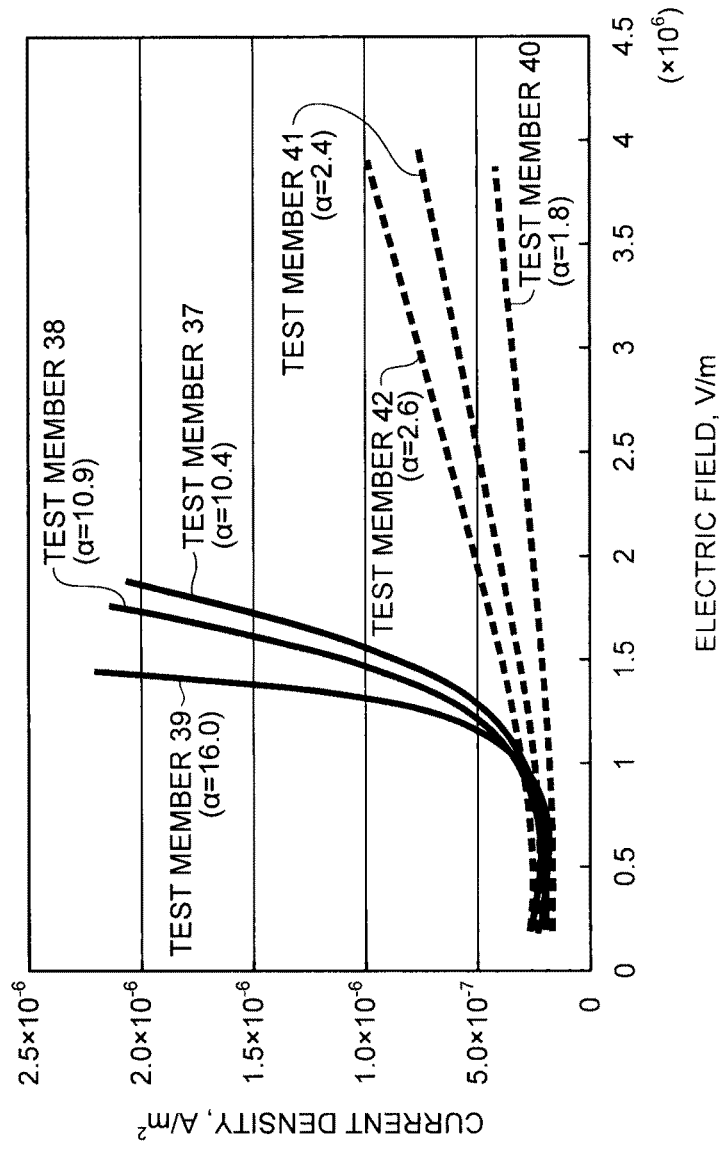
FIG. 14 is a chart illustrating results of evaluation tests of the nonlinear resistance characteristics when the polyurethane resin was used as the matrix resin.

Using the test members (Test Member 31 to Test Member 42), their nonlinear resistance characteristics were evaluated by the same method as that described in the above 1.(1). FIG. 13 is a chart illustrating results of evaluation tests of the nonlinear resistance characteristics when the acrylic resin was used as the matrix resin 22. FIG. 14 is a chart illustrating results of evaluation tests of the nonlinear resistance characteristics when the polyurethane resin was used as the matrix resin 22.

As illustrated in FIG. 13 and FIG. 14, Test Member 31 to Test Member 33 and Test Member 37 to Test Member 39 have current-electric field curves rising rapidly and values of the nonlinear index α of 5 or more and are thus found to have superior nonlinear resistance characteristics. In contrast to them, Test Member 34 to Test Member 36 and Test Member 40 to Test Member 42 have current-electric field curves rising slowly and values of the nonlinear index α of less than 5 and are thus found to be inferior in nonlinear resistance characteristic.

Note that though not illustrated here, the above-described superior nonlinear resistance characteristic has been confirmed in the case of containing 5 parts by mass or more of the surface-treated whiskers 10 to 100 parts by mass of the acrylic resin (the total compounding amount of the acrylic resin) or to 100 parts by mass of the polyurethane resin (the total compounding amount of the polyurethane resin). Further, in terms of workability, the content of the surface-treated whiskers 10 is preferably 30 parts by mass or less to 100 parts by mass of the acrylic resin (the total compounding amount of the acrylic resin) or to 100 parts by mass of the polyurethane resin (the total compounding amount of the polyurethane resin), and the above-described superior nonlinear resistance characteristic has been confirmed also in the case of containing 30 parts by mass of the surface-treated whiskers 10.

(3) Addition of the surface-treated whiskers 10 and the antisettling agent Here, about the case where the surface-treated whiskers 10 and the antisettling agent were added, the same evaluation as in the case where the surface-treated whiskers 10 were added described in the above 2.(1) was performed.

Except the addition of the antisettling agent together with the surface-treated whiskers 10, the same manufacturing method as those for the above-described Sample 19 to Sample 21 and Sample 25 to Sample 27 was used when producing a masterbatch. As the antisettling agent, alumina Aerosil having an average particle size of 23 nm was used. 1 part by mass of the antisettling agent was added to 100 parts by mass of the liquid acrylic resin (the total compounding amount of the acrylic resin) or to 100 parts by mass of the liquid polyurethane resin (the total compounding amount of the polyurethane resin).

Here, the nonlinear resistive coating material 20 containing 43 parts by mass of the ZnO-containing particles 21 to 100 parts by mass of the acrylic resin (the total compounding amount of the acrylic resin) is Sample 43, the nonlinear resistive coating material 20 containing 63 parts by mass is Sample 44, and the nonlinear resistive coating material 20 containing 89 parts by mass is Sample 45.

Further, for comparison, nonlinear resistive coating materials made by adding the untreated whiskers in place of the surface-treated whiskers 10 in the above-described three kinds of nonlinear resistive coating materials 20 were also produced. Note that in these coating materials, the configurations other than addition of the untreated whiskers are the same as those of the above-described three kinds of nonlinear resistive coating materials 20 (Sample 43 to Sample 45).

Here, the nonlinear resistive coating material having the untreated whiskers added thereto and containing 43 parts by mass of the ZnO-containing particles 21 to 100 parts by mass of the acrylic resin (the total compounding amount of the acrylic resin) is Sample 46, the nonlinear resistive coating material containing 63 parts by mass is Sample 47, and the nonlinear resistive coating material containing 89 parts by mass is Sample 48.

Test members 100 for evaluation of the nonlinear resistance characteristics were produced using the above-described Sample 43 to Sample 48 by the same method as the method described in the above 1.(1) (see FIG. 7). Note that the test member using Sample 43 is Test Member 43, the test member using Sample 44 is Test Member 44, the test member using Sample 45 is Test Member 45, the test member using Sample 46 is Test Member 46, the test member using Sample 47 is Test Member 47, and the test member using Sample 48 is Test Member 48.

Further, the nonlinear resistive coating material 20 containing 43 parts by mass of the ZnO-containing particles 21 to 100 parts by mass of the polyurethane resin (the total compounding amount of the polyurethane resin) is Sample 49, the nonlinear resistive coating material 20 containing 63 parts by mass is Sample 50, and the nonlinear resistive coating material 20 containing 89 parts by mass is Sample 51.

Further, for comparison, nonlinear resistive coating materials made by adding the untreated whiskers in place of the surface-treated whiskers 10 in the above-described three kinds of nonlinear resistive coating materials 20 were also produced. Note that in these coating materials, the configurations other than addition of the untreated whiskers are the same as those of the above-described three kinds of nonlinear resistive coating materials 20 (Sample 49 to Sample 51).

Here, the nonlinear resistive coating material having the untreated whiskers added thereto and containing 43 parts by mass of the ZnO-containing particles 21 to 100 parts by mass of the polyurethane resin (the total compounding amount of the polyurethane resin) is Sample 52, the nonlinear resistive coating material containing 63 parts by mass is Sample 53, and the nonlinear resistive coating material containing 89 parts by mass is Sample 54.

Test members 100 for evaluation of the nonlinear resistance characteristics were produced using the above-described Sample 49 to Sample 54 by the same method as the method described in the above 1.(1) (see FIG. 7). Note that the test member using Sample 49 is Test Member 49, the test member using Sample 50 is Test Member 50, the test member using Sample 51 is Test Member 51, the test member using Sample 52 is Test Member 52, the test member using Sample 53 is Test Member 53, and the test member using Sample 54 is Test Member 54.

Figure 15:
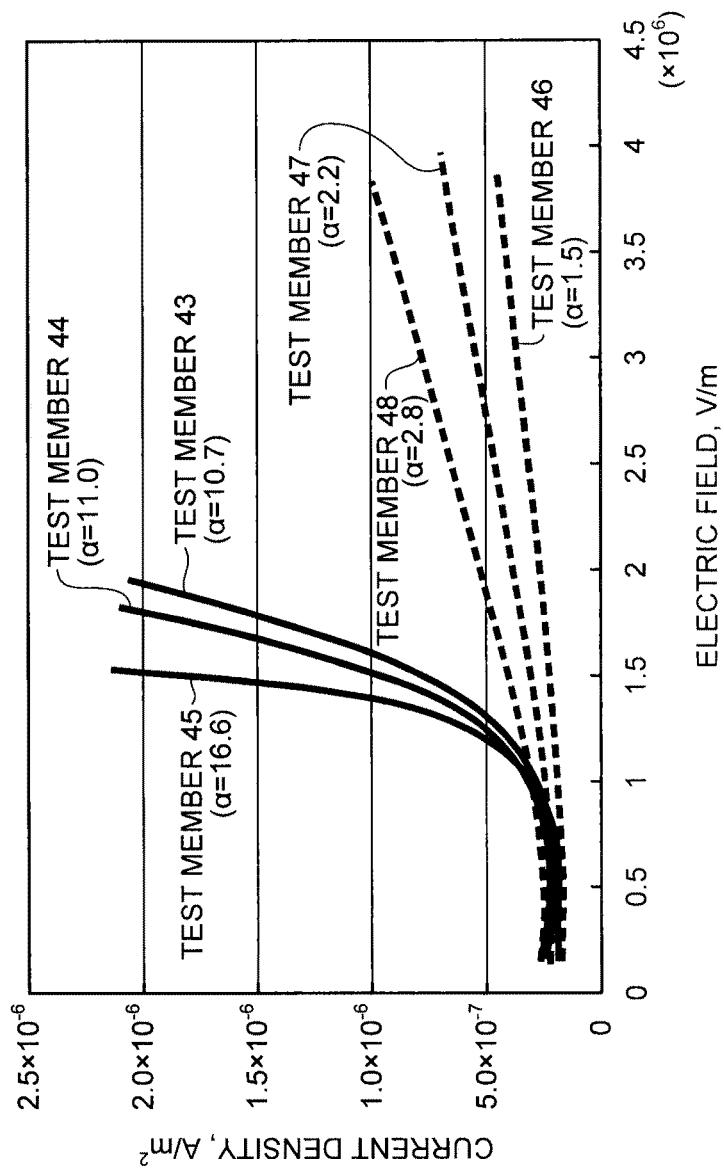
FIG. 15 is a chart illustrating results of evaluation tests of the nonlinear resistance characteristics when the acrylic resin was used as the matrix resin.
Figure 16:
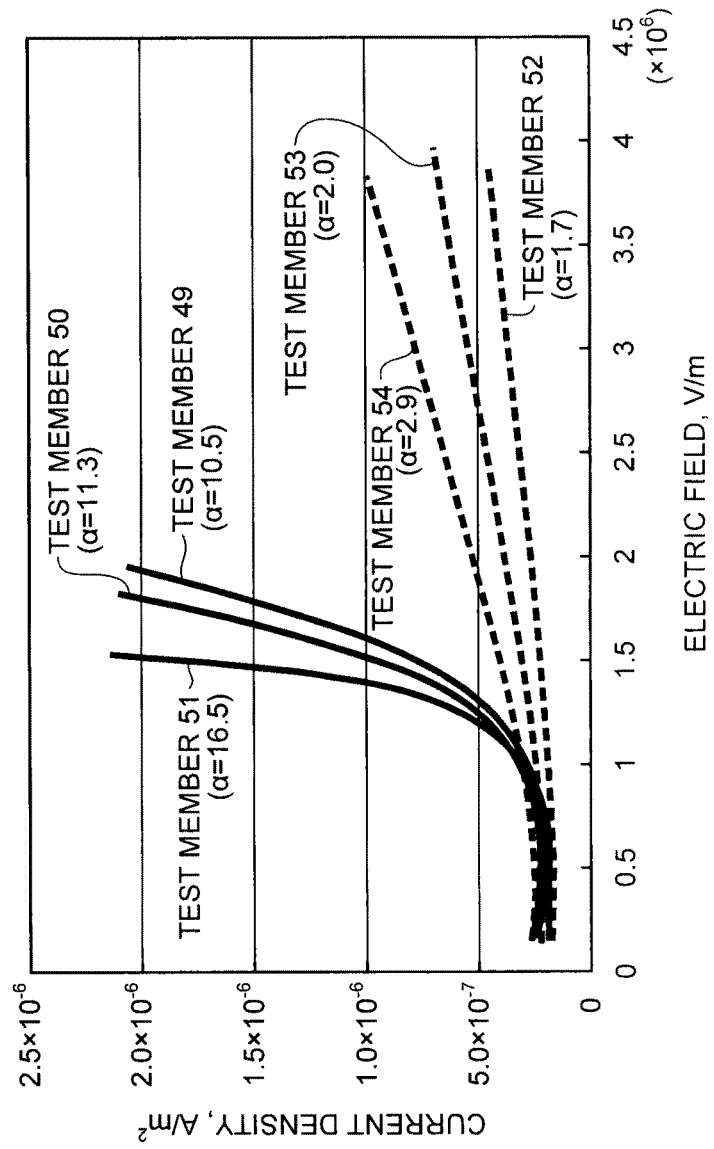
FIG. 16 is a chart illustrating results of evaluation tests of the nonlinear resistance characteristics when the polyurethane resin was used as the matrix resin.

Using the test members (Test Member 43 to Test Member 54), their nonlinear resistance characteristics were evaluated by the same method as that described in the above 1.(1). FIG. 15 is a chart illustrating results of evaluation tests of the nonlinear resistance characteristics when the acrylic resin was used as the matrix resin 22. FIG. 16 is a chart illustrating results of evaluation tests of the nonlinear resistance characteristics when the polyurethane resin was used as the matrix resin 22.

As illustrated in FIG. 15 and FIG. 16, Test Member 43 to Test Member 45 and Test Member 49 to Test Member 51 have current-electric field curves rising rapidly and values of the nonlinear index α of 5 or more and are thus found to have superior nonlinear resistance characteristics. In contrast to them, Test Member 46 to Test Member 48 and Test Member 52 to Test Member 54 have current-electric field curves rising slowly and values of the nonlinear index α of less than 5 and are thus found to be inferior in nonlinear resistance characteristic.

Note that though not illustrated here, the above-described superior nonlinear resistance characteristic has been confirmed in the case of containing 5 parts by mass or more of the surface-treated whiskers 10 to 100 parts by mass of the acrylic resin (the total compounding amount of the acrylic resin) or to 100 parts by mass of the polyurethane resin (the total compounding amount of the polyurethane resin). Further, in terms of workability, the content of the surface-treated whiskers 10 is preferably 30 parts by mass or less to 100 parts by mass of the acrylic resin (the total compounding amount of the acrylic resin) or to 100 parts by mass of the polyurethane resin (the total compounding amount of the polyurethane resin), and the above-described superior nonlinear resistance characteristic has been confirmed also in the case of containing 30 parts by mass of the surface-treated whiskers 10.

According to the above-described embodiment, it becomes possible to provide a nonlinear resistive coating material with which a superior nonlinear resistance characteristic can be obtained by uniformly dispersing a filler in a matrix resin 22, and a bus and a stator coil using the nonlinear resistive coating material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A nonlinear resistive coating material comprising:
   a matrix resin made of an acrylic resin, an epoxy resin or a polyurethane resin, which is cured by heating;
   particles dispersedly contained in the matrix resin and made of a sintered compact containing ZnO as a main component; and
   semiconductive whiskers dispersedly contained in the matrix resin and made of ZnO subjected to titanate coupling surface modification treatment.

2. The nonlinear resistive coating material according to claim 1, further comprising a diluting solvent.

3. The nonlinear resistive coating material according to claim 1, further comprising a dispersing agent made of a surface active agent.

4. The nonlinear resistive coating material according to claim 1, further comprising an antisettling agent made of a finely powdered material containing alumina, silica, or titania as a main component and having an average particle size of 5 nm to 40 nm.

5. The nonlinear resistive coating material according to claim 1, further comprising an antisettling agent made of talc.

6. The nonlinear resistive coating material according to claim 1, wherein said matrix resin is made of said acrylic resin, which is cured by heating.

7. The nonlinear resistive coating material according to claim 6, wherein said particles dispersedly contained in the matrix resin and made of a sintered compact containing ZnO as a main component have an average particle size of 10 μm to 100 μm, are present in a content of 40 parts by mass to 90 parts by mass based on 100 parts by mass of the matrix resin, and further contain at least one metal oxide selected from $Bi_2O_3$, $Co_2O_3$, MnO, $Sb_2O_3$, and NiO as a sub-component.

8. The nonlinear resistive coating material according to claim 1, wherein said matrix resin is made of said epoxy resin, which is cured by heating.

9. The nonlinear resistive coating material according to claim 1, wherein said matrix resin is made of said polyurethane resin, which is cured by heating.

10. The nonlinear resistive coating material according to claim 9, wherein said particles dispersedly contained in the matrix resin and made of a sintered compact containing ZnO as a main component have an average particle size of 10 μm to 100 μm, are present in a content of 40 parts by mass to 90 parts by mass based on 100 parts by mass of the matrix resin, and further contain at least one metal oxide selected from $Bi_2O_3$, $Co_2O_3$, MnO, $Sb_2O_3$, and NiO as a sub-component.

11. The nonlinear resistive coating material according to claim 1, wherein said particles dispersedly contained in the matrix resin and made of a sintered compact containing ZnO as a main component have an average particle size of 10 μm to 100 μm, and are present in a content of 40 parts by mass to 90 parts by mass based on 100 parts by mass of the matrix resin.

12. The nonlinear resistive coating material according to claim 11, wherein said particles dispersedly contained in the matrix resin and made of a sintered compact containing ZnO as a main component further contain at least one metal oxide selected from $Bi_2O_3$, $Co_2O_3$, MnO, $Sb_2O_3$, and NiO as a sub-component.

13. The nonlinear resistive coating material according to claim 12, wherein said particles dispersedly contained in the matrix resin and made of a sintered compact containing ZnO as a main component exhibit a nonlinear resistance characteristic.

14. The nonlinear resistive coating material according to claim 1, wherein said particles dispersedly contained in the matrix resin and made of a sintered compact containing ZnO as a main component exhibit a nonlinear resistance characteristics.

15. A nonlinear resistive coating material comprising:
   a matrix resin made of an epoxy resin which is cured by adding a curing agent thereto;
   particles dispersedly contained in the matrix resin and made of a sintered compact containing ZnO as a main cornponent; and
   semiconductive whiskers dispersedly contained in the matrix resin and made of ZnO subjected to titanate coupling surface modification treatment,
   the nonlinear resistive coating material further comprising a dispersing agent made of a surface active agent.

16. A nonlinear resistive coating material comprising:
   a matrix resin made of an epoxy resin which is cured by adding a curing agent thereto;
   particles dispersedly contained in the matrix resin and made of a sintered compact containing ZnO as a main component; and
   semiconductive whiskers dispersedly contained in the matrix resin and made of ZnO subjected to titanate coupling surface modification treatment,
   the nonlinear resistive coating material further comprising an antisettling agent made of a finely powdered material containing alumina, silica, or titania as a main component and having an average particle size of 5 nm to 40 nm.

17. A bus comprising:
a cylindrical metal container having an insulating gas sealed therein;
a high-voltage conductor disposed at a center of the metal container and in an axial direction; and
a nonlinear resistive film formed at least one of an inner peripheral surface of the metal container and a surface of the high-voltage conductor, and made of the nonlinear resistive coating material according to claim 1.

18. A stator coil comprising:
a coil conductor made of a conductor;
a main insulating layer provided to cover an outer peripheral surface of the coil conductor; and
a nonlinear resistive film provided to cover an outer peripheral surface of the main insulating layer, and made of the nonlinear resistive coating material according to claim 1.

19. A stator coil comprising:
a coil conductor made of a conductor;
a main insulating layer provided to cover an outer peripheral surface of the coil conductor;
an electric field relaxation layer provided on an outer peripheral surface of the main insulating layer; and
a nonlinear resistive film provided between the main insulating layer and the electric field relaxation layer or to cover an outer peripheral surface of the electric field relaxation layer, and made of the nonlinear resistive coating material according to claim 1.

* * * * *